United States Patent
Teyer et al.

(10) Patent No.: US 12,038,816 B2
(45) Date of Patent: Jul. 16, 2024

(54) DETERMINING INSIGHTS RELATED TO PERFORMANCE BOTTLENECKS IN A MULTI-TENANT DATABASE SYSTEM PRELIMINARY CLASS

(71) Applicant: Salesforce, inc., San Francisco, CA (US)

(72) Inventors: Paymon Teyer, San Ramon, CA (US); Alok K. Patel, Fremont, CA (US); Arjun Kumar Bachuwar, Nirmal (IN); Suraj Varma, Franklin Park, NJ (US); Jackson Zee Herrick, San Francisco, CA (US); Karishma Kishore Lalwani, Woodland Hills, CA (US)

(73) Assignee: Salesforce, Inc., San Francisco, CA (US)

( * ) Notice: Subject to any disclaimer, the term of this patent is extended or adjusted under 35 U.S.C. 154(b) by 21 days.

(21) Appl. No.: 17/934,932

(22) Filed: Sep. 23, 2022

(65) Prior Publication Data
US 2023/0099916 A1     Mar. 30, 2023

(30) Foreign Application Priority Data
Sep. 24, 2021   (IN) .............................. 202141043352

(51) Int. Cl.
*G06F 11/00*     (2006.01)
*G06F 11/07*     (2006.01)
(Continued)

(52) U.S. Cl.
CPC ...... *G06F 11/1484* (2013.01); *G06F 11/0754* (2013.01); *G06F 11/0769* (2013.01);
(Continued)

(58) Field of Classification Search
CPC ............ G06F 11/0751; G06F 11/0754; G06F 11/0769; G06F 11/079; G06F 11/0793; G06F 11/3409
See application file for complete search history.

(56) References Cited

U.S. PATENT DOCUMENTS 9,800,466  B1 * 10/2017  Rangole ............. G06F 11/3452
11,379,442 B2 *  7/2022  Gandi ...................... G06N 5/04
(Continued)

OTHER PUBLICATIONS

Hasselmeyer, Peer, et al., Towards Holistic Multi-Tenant Monitoring for Virtual Data Centers, 2010, IEEE (Year: 2010).*

*Primary Examiner* — Marc Duncan
(74) *Attorney, Agent, or Firm* — Holland & Hart LLP

(57) ABSTRACT

Methods, systems, apparatuses, and computer program products are described. A system, such as a multi-tenant database system, may store tenant-specific observability data for multiple tenants of the system. The system may detect an inefficiency related to a performance metric for a tenant of the multiple tenants based on a subset of the data associated with the tenant and corresponding to a threshold time window. In some examples, the system may analyze the subset of the data for the threshold time window to determine an insight indicating a cause of the inefficiency. The system may determine a suggested action for the tenant based on the insight indicating the cause of the inefficiency, and the system may send, for display at a user interface of a user device, an indication of the insight and the suggested action, the user device operated by a user associated with the tenant.

20 Claims, 11 Drawing Sheets

(51) Int. Cl.
*G06F 11/14* (2006.01)
*G06F 11/30* (2006.01)
*G06F 11/34* (2006.01)

(52) U.S. Cl.
CPC ........ *G06F 11/079* (2013.01); *G06F 11/0793* (2013.01); *G06F 11/3086* (2013.01); *G06F 11/3419* (2013.01); *G06F 11/0709* (2013.01)

(56) References Cited

U.S. PATENT DOCUMENTS

| | | | | |
|---|---|---|---|---|
| 2018/0027088 | A1* | 1/2018 | Zou | G06F 11/3082 709/224 |
| 2018/0278675 | A1* | 9/2018 | Thayer | H04L 41/0806 |
| 2019/0095241 | A1* | 3/2019 | Ago | G06F 16/24573 |

* cited by examiner

DETERMINING INSIGHTS RELATED TO PERFORMANCE BOTTLENECKS IN A MULTI-TENANT DATABASE SYSTEM PRELIMINARY CLASS

CROSS REFERENCE

The present application for patent claims the benefit of Indian Provisional Patent Application No. 202141043352 by Teyer et al., entitled "DETERMINING INSIGHTS RELATED TO PERFORMANCE BOTTLENECKS IN A MULTI-TENANT DATABASE SYSTEM," filed Sep. 24, 2021, assigned to the assignee hereof, and expressly incorporated by reference in its entirety herein.

FIELD OF TECHNOLOGY

The present disclosure relates generally to database systems and data processing, and more specifically to determining insights related to performance bottlenecks in a multi-tenant database system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationships management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform (or another platform) may support systems that store data for multiple tenants. In a multi-tenant platform, performance metrics may be collected for a user-defined (e.g., tenant-specific) application (e.g., sales, marketing) based on the data. In some cases, however, the ability of the platform to observe and detect both system-level and application-level performance bottlenecks may involve tenant-specific instrumentation at multiple layers of the stack. Accordingly, different tenants using the same platform for different applications may fail to receive performance metrics for their applications. Identifying and attributing performance metrics may not be supported on a tenant-by-tenant basis.

DETAILED DESCRIPTION

Figure 1:
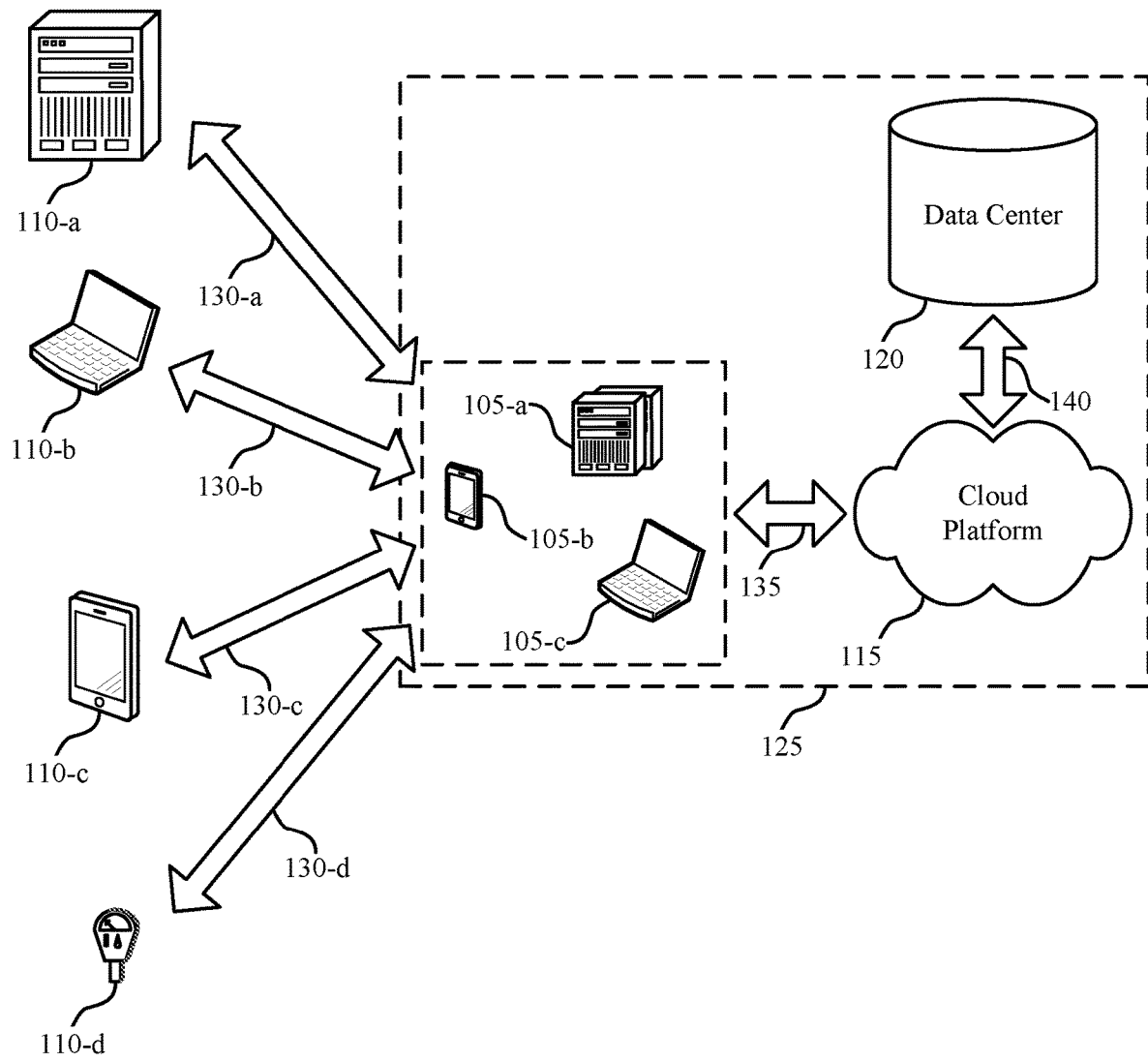
FIG. 1 illustrates an example of a system for cloud computing that supports determining insights related to performance bottlenecks in a multi-tenant database system in accordance with aspects of the present disclosure.

Techniques described herein support identifying performance bottlenecks in a multi-tenant, user-defined application (e.g., a customer relationships management (CRM) service or other service). For example, a tenant or users associated with the tenant may use a system that captures performance metrics, profiling data, and other metrics associated with activities or events, such as an integration (e.g., an integration between a multi-tenant platform and an application or other external system or platform) used by the tenant. In some cases, the metrics may be system-level performance metrics, application-level performance metrics, or both. For example, application-level performance metrics may be based on a user-defined application. Additionally, or alternatively, the system may identify performance bottlenecks (e.g., inefficiencies of scale), which may be reduced if the user takes corrective actions. As such, the system may provide high-level information about the overall performance of the tenant (e.g., across multiple users associated with the tenant, multiple applications associated with the tenant, multiple integrations or operations for the tenant).

A multi-tenant platform may support systems that store data for multiple tenants. In some cases, performance metrics may be collected on the multi-tenant platform for a user-defined application (e.g., an application for sales, marketing, integration, or other functions) based on the data. For example, the platform may identify performance metrics that may be improving or degrading the performance of the application. In some cases, however, the ability of the platform to observe and detect both system-level and application-level performance bottlenecks may involve tenant-specific instrumentation at multiple layers of the stack. Accordingly, different tenants using the same platform for different applications may fail to receive performance metrics for their individual applications. As such, a methodology of observing and detecting both system-level and application-level performance bottlenecks may help provide tenant-specific observability data in a multi-tenant system.

Specifically, the techniques described herein integrate a multi-tenant database system (e.g., a CRM service), processing devices, and a user interface of a user device such that users may analyze performance bottlenecks specific to a tenant of the multi-tenant database system. A user associated with a tenant may receive insights from the data services platform, where the insights identify performance bottlenecks, reasons for the performance bottlenecks, and, when possible, recommended corrective actions the user may take to improve the overall performance for the tenant (e.g., for an integration running for the tenant). For example, a multi-tenant database system may store tenant-specific observability data (e.g., performance data) for multiple tenants of the multi-tenant database system. In some examples, the multi-tenant database system may detect an inefficiency related to a performance metric for a tenant of the multiple tenants based on a subset of the tenant-specific observability data associated with the tenant and corresponding to a threshold time window (e.g., the previous week, the previous 24 hours, or some other time window). The multi-tenant database system may analyze the subset of the tenant-specific observability data for the threshold time window to determine an insight indicating a cause of the inefficiency. Based on the insight indicating the cause of the inefficiency, the multi-tenant database system may determine a suggested action for the tenant (e.g., an action associated with correcting or mitigating the cause of the inefficiency or otherwise improving the performance). The multi-tenant database system may send, for display at a user interface of a user device (e.g., a desktop device, a mobile device), an indication of the insight and the suggested action, where the user device may be operated by a user associated with the tenant.

Aspects of the disclosure are initially described in the context of an environment supporting an on-demand database service. Aspects of the disclosure are then described in the context of systems, user interfaces, and process flows. Aspects of the disclosure are further illustrated by and described with reference to apparatus diagrams, system diagrams, and flowcharts that relate to determining insights related to performance bottlenecks in a multi-tenant database system.

FIG. 1 illustrates an example of a system 100 for cloud computing that supports determining insights related to performance bottlenecks in a multi-tenant database system in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the data center 120, the cloud platform 115, the subsystem 125, or a combination thereof may support a multi-tenant database system. The system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants. As such, performance inefficiencies for a first tenant (e.g., an inefficient use of processing resources at scale) may potentially affect one or more other tenants sharing resources with the first tenant. Analyzing performance metrics and providing performance solutions for a specific tenant may improve system performance and resource availability both to the specific tenant and to other tenants sharing resources with the specific tenant in the multi-tenant system.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

The multi-tenant system may support providing insights associated with performance metrics (e.g., performance bottlenecks), reasons for the performance metrics (e.g., reasons for a negative pattern in one or more performance metrics), suggestions regarding how a user may improve the performance metrics, or any combination thereof to a user (e.g., a user device operated by the user) associated with a tenant. The user or user device operated by the user may be an example of a cloud client 105. In some examples, the multi-tenant system may support various actions that are used to observe and detect system-level or application-level performance bottlenecks, including retrieving data (e.g., from a CRM service), analyzing the data, creating insights, providing reasons and recommended corrective actions, or any combination thereof. In some cases, the multi-tenant system (e.g., a multi-tenant database system) may correlate data (e.g., performance metrics) across different stacks to analyze the performance bottlenecks of specific tenants. The multi-tenant database system may display the insights, display corresponding reasons for performance degradation, suggest corrective actions to the user, or any combination thereof via a user interface (e.g., of a corresponding user device, such as a cloud client 105). The user may use one or more suggested corrective actions to improve performance metrics, update user-defined code, or both.

To capture tenant-specific observability data in a multi-tenant system (e.g., a CRM service), an identifier (e.g., a unique identifier specific to a respective tenant) may be attached to multiple observability data points captured from different layers of the system that correspond to a same tenant. The observability data (e.g., performance data) may include basic metrics, logs, database transactions, user requests, distributed traces, profiling data, or any combination of these or other data parameters that are observed in the multi-tenant system. The identifier (e.g., a unique identifier) may be used to correlate information across different stacks to a same tenant, a same process, or both, which may allow deep analysis into performance bottlenecks (e.g., slowness, query bursts, other performance inefficiencies) affecting specific tenants.

An organization (e.g., a tenant of the multi-tenant database system) or users associated with a tenant (e.g., employees of the tenant organization) may use a system to capture performance metrics, customer data, and other metrics associated with the tenant. For example, a multi-tenant platform may support systems that store data for multiple tenants. In some cases, performance metrics may be collected on the multi-tenant platform for a user-defined application (e.g., sales, marketing) based on the data. For example, the platform may identify performance metrics that may be improving or degrading the performance of the application. However, in some other systems, observing and detecting both system-level and application-level performance bottlenecks may involve tenant-specific instrumentation at multiple layers of the stack. For example, other systems may fail to support the backend coding, the various applications, and additional features which may be used to create insights based on performance metrics across multiple tenants. Additionally, in some cases, such inefficiencies may not be detectable for a small number of users (e.g., less than a threshold number of users) but may become significant at scale across an organization (e.g., if the inefficiencies occur for greater than a threshold number of users of the organization). As such, such systems may fail to identify tenant-specific performance bottlenecks in a user-defined application for a multi-tenant system at scale, which may result in workflow inefficiencies and limited performance analytics.

Techniques described herein and performed by the system 100 may support identifying performance bottlenecks in a multi-tenant, user-defined application, which may be supported by the cloud platform 115 and a user interface of a user device (e.g., a cloud client 105). For example, a user associated with a tenant (e.g., employees of a tenant organization) may use a data services platform to understand insights associated with system-level performance bottlenecks, application-level performance bottlenecks, or both (e.g., inefficiencies of scale). The data services platform may include tools to observe and detect performance data and insights corresponding to the performance data (e.g., bottlenecks) and to provide corrective actions to the user. In some cases, the data services platform may correlate data (e.g., performance metrics) across different stacks, which may analyze the performance bottlenecks of specific tenants. The data services platform may display the insights and suggest corrective actions to the user via a user interface of a user device, where the user may select to implement the corrective actions to improve the performance metrics, user-defined code, or other features of the application.

The system 100 may integrate components of a system, including a multi-tenant database service (e.g., a CRM service), processing devices, user devices, or some combination thereof to analyze and surface performance bottlenecks (e.g., associated with an integration) for specific tenants. A user device (e.g., cloud client 105) associated with a tenant (e.g., operated by a user associated with a tenant ID for the tenant) may receive insights identifying performance bottlenecks, reasons for the performance bottlenecks, recommended corrective actions the user may take to improve the overall performance of the integration, or some combination thereof. The user device may present such information in a user interface (e.g., visually, audibly, tactilely). A multi-tenant database system may store tenant-specific observability data (e.g., performance data) for multiple tenants of the multi-tenant database system. In some examples, the multi-tenant database system may detect an inefficiency related to a performance metric for a tenant of the multiple tenants based on a subset of the tenant-specific observability data associated with the tenant and corresponding to a threshold time window. The multi-tenant database system may analyze the subset of the tenant-specific observability data for the threshold time window to determine an insight indicating a cause of the inefficiency. Based on the insight indicating the cause of the inefficiency, the multi-tenant database system may determine a suggested action for the tenant. The multi-tenant database system may send, for display at a user interface of a user device (e.g., a desktop device, a mobile device), an indication of the insight and the suggested action, the user device being operated by a user associated with the tenant.

Identifying performance bottlenecks in a multi-tenant, user-defined application (e.g., integration) may support improved workflow efficiencies and reduced processing overhead by utilizing a centralized system for maintaining and executing workflows to detect the performance bottlenecks. For example, because the techniques described herein support identifying insights associated with various performance bottlenecks, the techniques may support producing application-level metrics and logs on a per-tenant basis and profiling user-defined code for each tenant. As another example, because the techniques described herein support providing corrective actions to improve performance metrics, the techniques may support tenant-specific workflows that may be implemented to best fit user-defined code (e.g., user-defined applications), allowing individual analysis and corresponding performance improvements for each tenant.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
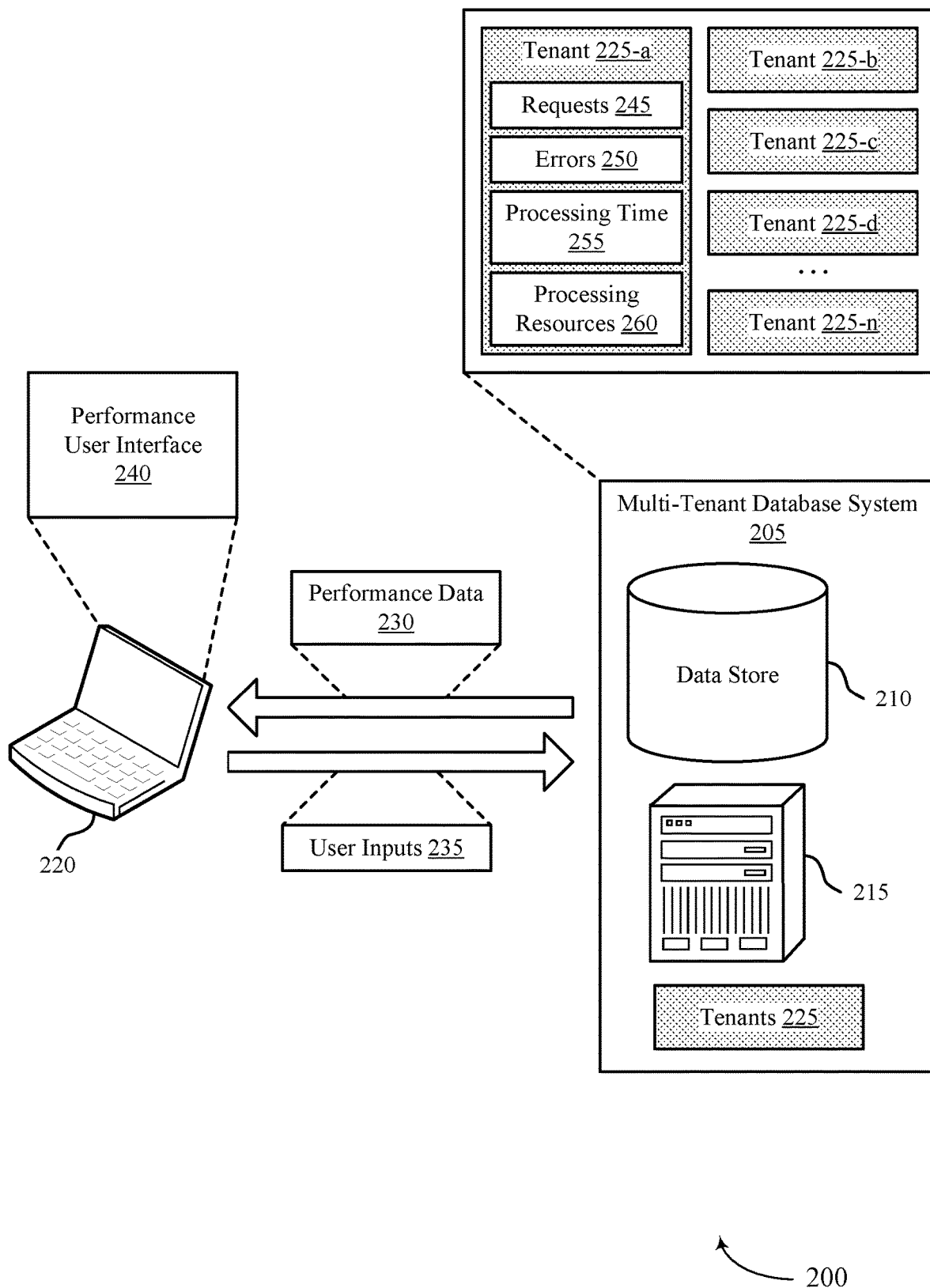
FIG. 2 illustrates an example of a system that supports collecting observability data and determining insights related to performance bottlenecks in a multi-tenant database system in accordance with aspects of the present disclosure.

FIG. 2 illustrates an example of a system 200 that supports collecting observability data and determining insights related to performance bottlenecks in a multi-tenant database system in accordance with aspects of the present disclosure. The system 200 may be an example of a system 100 or a subsystem 125 as described with reference to FIG. 1. The system 200 may include a multi-tenant database system 205 that may store and process data for multiple tenants 225. Data for different tenants 225 may be stored separately, such that users associated with one tenant 225 may be restricted from accessing data associated with a different tenant 225. A user, operating a user device 220, may send requests to the multi-tenant database system 205 to view data records, create data records, modify data records, aggregate or analyze data, or any combination thereof. To access data in the multi-tenant database system 205, a user may have a user ID associated with a specific tenant 225 (e.g., linked to a specific tenant ID). Additionally, or alternatively, the user ID may be associated with a specific access level defining the operations that the multi-tenant database system 205 supports for the user (e.g., what data may be viewed or modified by that level of user or that specific user). The multi-tenant database system 205 may include one or more data stores 210 for storing data, one or more processing devices 215 (e.g., a database server, application server, worker server, server cluster, cloud-based resources, virtual machine, container, or any combination of these or other devices capable of processing data), or both. The multi-tenant database system 205 may be an example of a cloud platform 115, a data center 120, or a combination thereof, and the user device 220 may be an example of a cloud client 105 as described with reference to FIG. 1. The multi-tenant database system 205 may support analyzing performance data 230 for a tenant 225 at scale.

The multi-tenant database system 205 may securely store data for multiple separate tenants 225, such as a tenant 225-*a*, a tenant 225-*b*, a tenant 225-*c*, a tenant 225-*d*, up to a tenant 225-*n*. It is to be understood that the multi-tenant database system 205 may support any quantity of tenants 225. The multi-tenant database system 205 may store tenant-specific performance data, for example, in a set of data logs. The logs may be structured according to a database schema that supports efficient creation of logs (e.g., in response to any activities performed for a tenant 225), efficient querying of the logs (e.g., across thousands or millions of rows in the logs), or both. The data log for a tenant 225 may track performance data 230 specific to that tenant 225. As an example, the multi-tenant database system 205 may store requests 245, errors 250, processing times 255, processing resources 260, or any combination of these or other performance parameters in the data log for the tenant 225-*a*. If a user of the tenant 225-*a* accesses the multi-tenant database system 205 (e.g., logs into the system, sends a request to the system), the multi-tenant database system 205 may capture one or more aspects of the activity in a log entry (e.g., a row of the log, with the columns of the log corresponding to specific values associated with the activity). Additionally, or alternatively, the multi-tenant database system 205 may capture information associated with integrations to the multi-tenant database system 205. For example, if an integration between the multi-tenant database system 205 and a third-party service communicates data (e.g., into the multi-tenant database system 205 or out of the multi-tenant database system 205), the multi-tenant database system 205 may capture one or more aspects of the integration activity in a log for the corresponding tenant 225.

The multi-tenant database system 205 may collect, organize, and analyze the performance metrics for a tenant 225 and present one or more results of the analysis to users of the tenant 225. For example, a user associated with the tenant 225-*a* and operating a user device 220 may receive performance data 230 for the tenant 225-*a*. One or more processing devices 215 may analyze the set of data logs on the backend to determine the performance data 230 for display in a user interface (e.g., a performance user interface 240) at the user device 220. The multi-tenant database system 205 may analyze the performance metrics for a tenant 225 such that the underlying data is secure according to one or more security policies. For example, running the performance analysis may refrain from (e.g., restrict) accessing any personal identifiable information (PII) stored for a tenant 225. Additionally, or alternatively, the performance analysis may obfuscate specific underlying metrics and surface aggregate performance data 230 that does not allow a user to determine the underlying metrics contributing to the aggregate performance data if the user is restricted from viewing the specific underlying metrics (e.g., metrics associated with one or more specific users, metrics associated with one or more specific clients).

The performance data 230 may be both tenant-specific and tenant-wide. For example, the performance data 230 for the tenant 225-*a* may not depend on—or risk surfacing—any data from other tenants 225 of the multi-tenant database system 205. Additionally, the performance data 230 may be generated from a complete set of data for the tenant 225-*a* (e.g., across multiple or all users of the tenant 225-*a*, across multiple or all data objects of the tenant 225-*a*, across multiple or all processing resources of the tenant 225-*a*). As such, the multi-tenant database system 205 may generate and analyze the performance data 230 at scale (e.g., running queries on massive amounts of data logs, such as thousands or millions of log entries). For example, the multi-tenant database system 205 may leverage one or more services that support queries on massive sets of data (e.g., above a threshold data size), such as Splunk queries.

The multi-tenant database system 205 may additionally include one or more safeguards to stop inefficient processing, such as a threshold quantity of queries that may be performed concurrently, a time-out value for stopping processes that take longer than a threshold time or more than a threshold amount of computing resources, or any other safeguards. In some cases, the multi-tenant database system 205 may periodically, aperiodically, or continuously run performance analysis procedures on the logs on the backend, updating the logs used based on new activities captured in the set of data logs (e.g., in realtime or pseudo-realtime based on runtime data, design-time data, or both). In some examples, the performance data 230 may correspond to a specific time period, a specific set of errors 250, or some other filter. For example, the multi-tenant database system 205 may determine a time frame for analysis, and the processing devices 215 may calculate the one or more aggregate performance metrics based on a subset of the performance data 230 associated with activities performed during the time frame.

Additionally, or alternatively, the processing devices 215 may determine tenant-agnostic performance data across multiple tenants 225. Such performance data 230 may support insights into pre-configured code, data objects, processes, or a combination thereof defined by the multi-tenant database system 205 for use by any tenant 225. The tenant-agnostic performance data may be viewed and analyzed by users (e.g., administrative users) associated with the multi-tenant database system 205, as opposed to users associated with any one tenant 225.

The multi-tenant database system 205 may send the performance data 230 for display by the user device 220 in a performance user interface 240. In some examples, the performance user interface 240 may present the performance data 230 on a timeline, in a pie chart, in a bar graph, or in any other display configuration. The performance user interface 240 may allow a user of the user device 220 to view the performance data 230 and dig into specific aspects of the performance data 230. For example, the user may use one or more user inputs 235 to the performance user interface 240 to view specific performance data 230, analyze specific performance data 230, or perform other operations associated with performance analysis at scale for a tenant 225.

As described herein, the multi-tenant database system 205 may support identifying performance bottlenecks in a user-defined application. For example, the processing devices 215 may correspond to or otherwise support various tools a user (e.g., a marketer, a sales associate) may use to capture tenant-specific observability data in a multi-tenant system, such as the multi-tenant database system 205 (e.g., a sales service, a CRM service). To capture tenant-specific observability data in the multi-tenant system, the multi-tenant database system 205 may attach an identifier (e.g., a unique identifier) to multiple observability data points captured from different layers of the system (e.g., development, production, implementation) for individual tenants 225. That is, the unique identifier may indicate related data across layers for the same tenant 225, the same process (e.g., an integration), or some combination of these or other relationships. In some examples, the "unique" identifier may be unique at the time that the identifier is used (e.g., active in the system), but may be reused for another purpose at a later time (e.g., non-unique across time). The observability data may include the performance data 230, such as basic metrics, logs, database transactions, user requests, distributed traces, profiling data, or any combination of these or other data captured from different layers of the multi-tenant database system 205 (e.g., information captured at development time, production time, implementation time). The unique identifier may be used to correlate information across different stacks, which may allow deep analysis into performance bottlenecks of specific tenants 225. In some examples, application-level metrics and logs may be divided based on a tenant identifier. In addition, user-defined code, tenant-specific workflows, or both may be profiled for each tenant 225 and tagged with the tenant identifier. The multi-tenant database system 205 may analyze performance bottlenecks for specific tenants 225 on an individual tenant basis. The analysis may support implementing or improving tenant-specific workflows to effectively fit the user-defined code, which may enable each tenant 225 to perform personalized analyses of the performance data 230 and update tenant-specific workflows, code, or other processes according to the analyses.

In some examples, the multi-tenant database system 205 may enable customers to view performance metrics, customer data, and other metrics associated with an integration to understand the overall performance of the tenant 225. For example, the multi-tenant database system 205 may provide the processing devices 215 with data such as a number of logins to a platform, which the processing devices 215 may analyze to determine a percentage of the logins which were successful (e.g., did not include errors 250, did not include other performance issues).

The processing devices 215 may support identifying the performance bottlenecks (e.g., a processing time 255 exceeding a processing time threshold, a quantity of processing resources 260 exceeding a processing resource threshold, a quantity of memory resources exceeding a memory resource threshold, a quantity of errors 250 exceeding an error threshold) and displaying insights corresponding to the performance bottlenecks to a user via the user device 220. For example, the processing devices 215 may use the performance data 230 collected and shared by the multi-tenant database system 205 to identify one or more performance bottlenecks associated with an integration (e.g., for a tenant 225). An integration may include bulk data loading, a bulk data transfer, a bi-directional integration between the multi-tenant database system 205 and an external system (e.g., data flowing from the multi-tenant database system 205 into the external system or into the multi-tenant database system 205 from the external system), or any combination thereof. Additionally, or alternatively, an application programming interface (API) or an architecture associated with an application may be associated with an integration. In some examples, the performance data 230 may be used to perform investigation analyses (e.g., an investigation of an error of a specific log).

Based on identifying the one or more performance bottlenecks, the processing devices 215 may create insights describing a performance bottleneck, a reason for a performance bottleneck, a recommended corrective action the user may take to reduce the effect of a performance bottleneck, an automatic action to improve the performance bottleneck, or any combination thereof. The processing devices 215 may send, for display at the user device 220, the insights and relevant performance data 230. The user device 220 may present the insights and relevant performance data 230 at the performance user interface 240 (e.g., in a mobile application, a desktop application). The performance data 230 may include data collected from an integration such as metrics, traces, anomalies, performance test results, or any other performance data 230. In addition, the processing devices 215 may generate the insights based on the performance data 230 collected for a relatively long period of time (e.g., end user logs collected for seven days, such as the past seven days with a rolling time window). As such, the processing devices 215 may use relatively large amounts of various types of performance data 230 to generate the insights (e.g., thousands or millions of rows of a data log).

In some examples, a user (e.g., a tester, a data analyst) may run a set of performance tests over a particular time period (e.g., one week). The performance tests may test for central processing unit (CPU) utilization, time for a page to load, user response time, or any other metrics associated with a server (e.g., corresponding to the processing devices 215) or user experience. In some examples, the user may re-run the performance tests for the same amount of time (e.g., one week) at a later date. The performance data 230 collected from the performance tests (e.g., via the multi-tenant database system 205) may be shared with the processing devices 215, which may provide insights based on analyzing the performance test data, code used for custom components, custom workflows, or other tenant-specific code, techniques (e.g., best practices) followed while developing the code, or any combination thereof. For example, the processing devices 215 may identify an insight associated with a bulk data load, where an older version of a corresponding bulk API was used. The processing devices 215 may recommend to the user to disable a conflicting integration (e.g., upgrade the bulk API to better support the bulk data load). As such, the processing devices 215 may analyze data output by a series of tests run over a relatively long period of time (e.g., a day, a week, a month) to develop insights about the implementation of the tests and the performance data 230 and to provide suggested corrective actions to users.

The processing devices 215 may analyze multiple aspects of the data to provide insights to the user. For example, the processing devices 215 may analyze the code associated with the implementation of workflows, performance at run time, logs, background processes, custom object definitions, variables and parameters input to the implementation, traces (e.g., distributed tracing data), profiling (e.g., over Apex), anomaly detection, or any other features of the data. In some examples, the processing devices 215 may create insights on a per-tenant basis, a multi-tenant basis, or a user basis. For example, the multi-tenant database system 205 may collect performance data 230 from multiple tenants 225 (e.g., a relatively large quantity of tenants, such as 1000), and the processing devices 215 may analyze the performance data 230 associated with the multiple tenants 225 to derive insights for the multiple tenants 225 or individual tenants 225. In some examples, the user may utilize insights on a multi-tenant basis to enhance and improve existing products (e.g., implementations) used across tenants within the multi-tenant database system 205 such that future tenants 225 may not experience the same deficiencies.

In some cases, the insights may be based on errors in the implementation. Additionally, or alternatively, the insights may be triggered based on inefficiencies of scale detected in the implementation. For example, the processing devices 215 may identify scale patterns such as patterns of slowness, bursts (e.g., thousands of records aggregating in a short period of time), or any other scale pattern. The inefficiencies of scale may not be categorized as an error (e.g., by the processing devices 215), but may nonetheless introduce inefficiencies to the implementation. Insights may also be generated based on misuse of a product (e.g., if a user is using a relatively small quantity of data points for bulk data analysis) or based on poor functionality of the product. In some examples, the processing devices 215 may use pattern matching and recognition (e.g., pattern detection and rate matching) on performance data on an ongoing basis such that any inconsistencies in the pattern over a relatively long period of time may be flagged as insights. That is, the processing devices 215 may be a backend process monitoring for and generating insights at any stage of the product (e.g., development, production, implementation) without a request from the user. In some examples, the processing devices 215 may perform static threshold matching to validate that specific metrics (e.g., CPU usage) are being met by the implementation. In some examples, an insight may be based upon anomaly detection (e.g., if CPU usage is consistently high but suddenly changes significantly).

The multi-tenant database system 205 may analyze metrics associated with requests 245, errors 250, processing times 255, processing resources 260, or other information relating to performance for a tenant 225-a. For example, the multi-tenant database system 205 may analyze design time data (e.g., code designed for the tenant 225-a, a custom configuration for data objects designed for the tenant 225-a, design time errors 250), runtime data (e.g., the processing times 255, processing resources 260, runtime errors 250), or both. In some cases, the multi-tenant database system 205 may use the metrics to determine historical patterns or preferences specific to a tenant 225-*a*. For example, the multi-tenant database system 205 may determine the types of operations performed most often by the tenant 225-*a*, times of day when the tenant 225-*a* is most active (e.g., when users of the tenant 225-*a* are performing a majority of requests 245 for the tenant 225-*a*), or other tenant-specific metrics. Additionally, or alternatively, the multi-tenant database system 205 may determine an integration, an application, a user, a data object, a process flow, or some other aspect associated with the tenant 225-*a* that contributes relatively more towards performance bottlenecks. The multi-tenant database system 205 may analyze improvements specific to the integration, application, user, data object, process flow, or other aspect. For example, the multi-tenant database system 205 may automatically roll-back an update to the tenant 225-*a* if the update (e.g., a new integration, an update to an application, a custom feature or custom data object) contributes above a threshold amount towards a performance bottleneck.

In some examples, the tenant 225-*a* may support a bulk operation that operates on a set of data including a relatively large quantity of data objects (e.g., above a data object threshold). However, such a bulk operation may row lock or table lock the relatively large quantity of data objects concurrently for an extended time period (e.g., longer than a threshold time period) while the bulk operation is updating the set of data. Such a bulk operation may result in one or more row lock errors (e.g., errors 250) if other transactions are performed during the bulk operation on data in the set of data. In some cases, the multi-tenant database system 205 may recommend (e.g., via an insight) an improved batch process for performing the bulk operation, such that data objects affected by the bulk operation are not locked at the same time, are locked for a relatively shorter portion of the bulk operation, or both. In some examples, the multi-tenant database system 205 may implement the batch process (e.g., automatically or based on a user input 235) to improve the performance of the tenant 225-*a*. For example, the multi-tenant database system 205 may determine a quantity of data objects to use in batches for batch processing of the bulk operation, and the multi-tenant database system 205 may perform the bulk operation on one batch at a time. Accordingly, a relatively small subset of the set of data (e.g., the data objects corresponding to a specific batch) may be locked at any given time, and these data objects may be unlocked when updating is complete for the batch, not for the entire set of data, significantly reducing the amount of time that any one data object is locked during the bulk operation. The multi-tenant database system 205 may automatically identify operations that may benefit from batch processing (e.g., based on analysis of the code, analysis of the processing resource usage, analysis of locked resources) and may automatically implement batch processing for the identified operations to improve the performance of the tenant 225-*a* (e.g., based on one or more insights, one or more recommendations, or both). In some cases, the multi-tenant database system 205 may perform the batch processing transparent to the tenant 225-*a*.

Additionally, or alternatively, the tenant 225-*a* may support a transaction that modifies one or more data objects in the data store 210. For example, the tenant 225-*a* may create or install an application that executes the transaction at the data store 210. In some cases, the data store 210 may potentially encounter row lock errors (e.g., errors 250) associated with multiple similar transactions. For example, if a first transaction is executed at the data store 210 on a first row, the data store 210 may lock the first row for a short time period during execution of the transaction. As the scale of the tenant 225-*a* increases, the likelihood that another transaction attempts to modify the first row during this short time period increases. As such, a second transaction may attempt to modify the first row while the first row is locked, resulting in a row lock error (e.g., and a failed execution of the transaction or an increased latency associated with executing the transaction).

In some cases, the multi-tenant database system 205 may recommend a modification to the code for the transaction or the application performing the transaction to reduce the likelihood of row lock errors. For example, the multi-tenant database system 205 may identify that the portion of the code executing the transaction may be performed as an asynchronous job to reduce the likelihood of multiple transactions occurring concurrently for the same data object. In some examples, the multi-tenant database system 205 may send, for display at the user device 220, a suggested update to the code to improve the performance of the tenant 225-*a*. In some other examples, the multi-tenant database system 205 may automatically switch a portion of code to be performed as an asynchronous job to improve the tenant performance.

In some other cases, the multi-tenant database system 205 may recommend a reorganization of data in the data store 210 to reduce the likelihood of row lock errors. In some examples, the multi-tenant database system 205 may automatically perform the reorganization of the data for the tenant 225-*a* at the data store 210 (e.g., an update to a database schema for the multi-tenant database system 205) to improve the scalability of the tenant 225-*a*. For example, a tenant 225-*a* may add multiple custom fields to a first data object to store information relating to the first data object. However, multiple different transactions may affect one or more of these custom fields, resulting in row lock errors for the first data object. The multi-tenant database system 205 may recommend using a second, separate data object to store one or more of these custom fields, where this second data object includes a reference to the corresponding first data object.

Such a reorganization of the data may improve performance of the tenant 225-*a*, for example, if the data store 210 handles a massive quantity of transactions (e.g., above a threshold quantity of transactions) updating one or more fields associated with the data objects. In some other examples, however, using two data objects rather than one data object may reduce the performance of a tenant (e.g., increasing latency for some search operations). The multi-tenant database system 205 may determine, on a tenant-by-tenant basis, a recommendation to mitigate a performance bottleneck, where the recommendation for one tenant 225-*a* may fail to improve performance for a second tenant 225-*b* based on one or more tenant-specific configurations, processes, applications, data use cases, frequencies of transactions, quantities of users, quantities of data objects, or any combination thereof. For example, operations that may improve the performance of a first tenant 225-*a* with a relatively large quantity of users, each with relatively small data sets in the data store 210, may be different from operations that may improve the performance of a second tenant 225-*b* with a relatively small quantity of users, each with relatively large data sets in the data store 210. Similarly, operations that may improve the performance of a first tenant 225-*a* that performs mostly search functions in the data store 210 (e.g., greater than a threshold proportion of processes executed for the first tenant 225-*a* are search functions) may be different from operations that may improve the performance of a second tenant 225-*b* that performs mostly insert and aggregation functions.

The multi-tenant database system 205 may use information derived from one tenant 225-*b* to improve the performance for another tenant 225-*a* if the improvement obfuscates any tenant-specific information. For example, the multi-tenant database system 205 may identify a portion of code or an order of performing processes used by the tenant 225-*b* that contributes positively towards the performance of the tenant 225-*b* (e.g., mitigating or otherwise avoiding a performance bottleneck). The multi-tenant database system 205 may recommend similar code or a similar order of performing processes to the tenant 225-*a* to improve the performance of the tenant 225-*a*, for example, if the recommendation does not compromise any protected data or information for the tenant 225-*b*. As such, the multi-tenant database system 205 may leverage the differences between tenants to determine tenant-specific updates to improve performance metrics for tenants 225.

If the processing devices 215 fail to detect an insight for a tenant 225, the processing devices 215 may refrain from showing an insight but may continue to share the performance data 230 (e.g., what transpired during the implementation or a performance test). The processing devices 215 may additionally provide resources for viewing and understanding by the user, which may include more information for the user about scalability, performance, or other features associated with the multi-tenant database system 205.

In some examples, the processing devices 215 may provide an insight to a user based on a previous investigation performed by the user (e.g., of a specific log) or without any prior investigations. For example, an insight may be generated based on source code for the implementation during a design phase, which may provide the user with recommended features to implement into the code before running the full implementation. The insights may be used to provide guidance on how to improve code development for a specific application. For example, the processing devices 215 may perform an automated analysis of the code and aspects of the implementation based on how the application behaves, in which case an insight may be provided based on factors such as runtime data. Additionally, or alternatively, the processing devices 215 may perform a root cause analysis over a period of time (e.g., to identify a pattern occurring repeatedly over time) and, based on the analysis, may derive a probable root cause (e.g., a reason) for the insight. The processing devices 215 may monitor for the performance data 230 from the multi-tenant database system 205, correlate the performance data 230 (e.g., using artificial intelligence (AI) or statistical functions), and determine recommendations to provide to users based on an insight.

In some examples, the processing devices 215 may leverage aspects of how different tenants 225 are structured to develop insights. For example, the processing devices 215 may analyze an implementation during production (e.g., while it is being used by a user associated with the tenant 225), during the design of the implementation, or during other stages of the implementation based on the specific application of the tenant 225. For example, the processing devices 215 may identify an insight that reports have loaded significantly slower than expected for a set of users over a two-week period. The processing devices 215 may identify that the reason for this insight may be that the user's querying of the data system is too broad and may recommend that the user narrows the queries to increase loading speeds. As such, the processing devices 215 may analyze a product while it is live, identify that users have an improved experience while using this product, determine reasons for poor performance, and identify corrective actions the user may take to improve the performance.

As an example, the processing devices 215 may identify that a query is being executed significantly more frequently than expected (e.g., the query may be executed many more times than corresponding data changes). The processing devices 215 may provide a corresponding insight to the user and a recommendation that the user may reduce the frequency of the query to reduce processing overhead in the backend. In another example, the processing devices 215 may detect an insight that a certain page is being loaded very frequently (e.g., much more often than a human may be able to load the page). The processing devices 215 may identify that the reason for this insight is an auto-refresh extension that is installed in the browser. As such, the processing devices 215 may recommend to uninstall the auto-refresh extension and to provide a notification to the user if the extension is re-installed. In another example, a user may implement a custom type search component, where the backend may attempt to provide results to the user based on matching each character the user types in a search field. The processing devices 215 may identify an insight that the backend is receiving bursts of the same software query in short intervals and nothing else for a long period of time after that. The processing devices 215 may identify that the reason for the query bursts is because each time a user presses a key, the system sends a query to the backend. As such, the processing devices 215 may recommend to perform a search (e.g., transmit the query) after three or four characters have been typed, and to refrain from continuously searching (e.g., refrain from transmitting the query again) until the user has stopped typing. Accordingly, the multi-tenant database system 205 may determine any type of insight to improve a performance bottleneck for one or more tenants 225 and may provide a recommendation to a user based on the insight or may automatically perform one or more operations (e.g., limiting a quantity of queries that may be performed by a user within a threshold time window, uninstalling an extension, modifying a search function) to improve the performance bottleneck.

Figure 3:
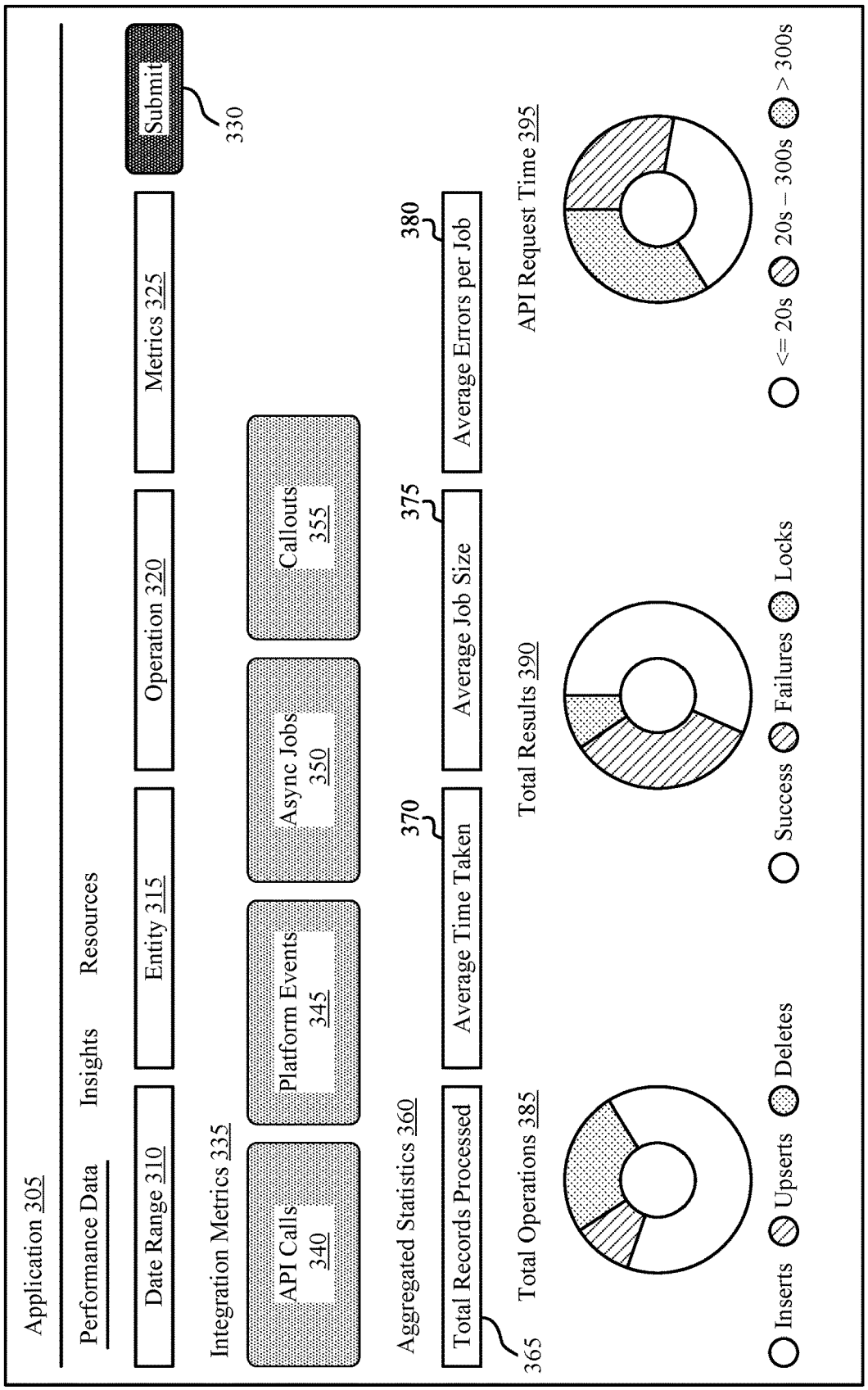
FIGS. 3 and 4 illustrate examples of user interfaces that support determining insights related to performance bottlenecks in a multi-tenant database system in accordance with aspects of the present disclosure.

FIG. 3 illustrates an example of a user interface 300 that supports determining insights related to performance bottlenecks in a multi-tenant database system in accordance with aspects of the present disclosure. The user interface 300 may be implemented by the multi-tenant database system 205 described herein with reference to FIG. 2 and may support identifying performance bottlenecks in a multi-tenant, user-defined application. For example, the user interface 300 may provide performance data associated with an integration (e.g., an application, a product) that may be used to provide insights. A user device (e.g., a laptop, a mobile device, a desktop computer) may display the user interface 300 to a user associated with a tenant of the multi-tenant database system. For example, the user interface 300 may be displayed as part of a performance user interface 240 described herein with reference to FIG. 2. A user may access the user interface 300 to analyze and investigate performance data corresponding to the tenant. The user interface 300 may be an example user interface for presenting such information to a user. Additional, or alternative, user interface configurations may be implemented to support similar displays, functionality, or both.

The user may access an application 305 (e.g., a tool for managing and analyzing tenant processes at scale, such as the Scale Center application) to view the user interface 300.

Figure 4:
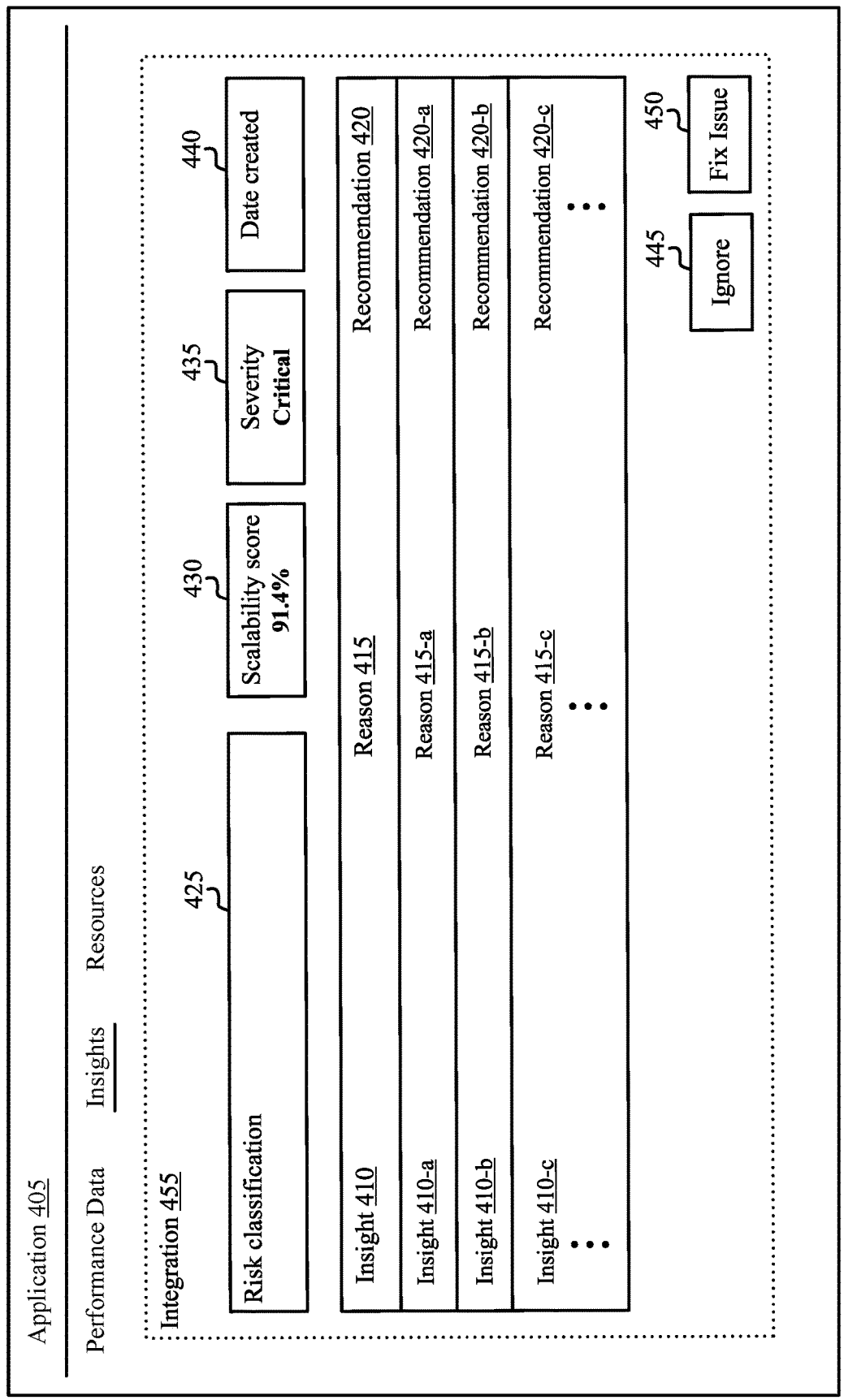

In some cases, the application 305 may support multiple views, including a performance data view (e.g., the user interface 300), an insights view (e.g., a user interface 400 described herein with reference to FIG. 4), a resources view (e.g., providing one or more resources to help the user understand the application 305 or specific metrics), or any combination thereof. In some cases, the application 305 may hide specific subsets of data from a user based on the user's access level, credentials, role within a tenant, or any combination thereof. Additionally, the application 305 may securely handle the performance data for the tenant, such that users associated with different tenants are restricted from accessing the performance data for the tenant.

The user interface 300 may support focused analysis of performance data for the tenant using one or more filters. For example, the user viewing the user interface 300 may input a date range value 310, one or more entities 315 for analysis, one or more operations 320 for analysis, one or more metrics 325 for analysis, or any combination of these or other filters. In some examples, the user may select a submit button 330 to apply the set of user input filters. For example, selecting the submit button 330 may trigger the application 305 to query performance data, aggregate performance data, or both based on the set of user input filters. For example, the user may select to analyze performance data for the previous 24 hours using the date range value 310. The user may select a specific entity 315 (e.g., a specific data object, such as a customer data object) to analyze performance data relating to calls involving the specific entity 315 (e.g., modifications to the entity, queries of the entity). Alternatively, the user may select multiple entities 315 or may indicate to analyze "All" entities 315. The user may select a specific operation 320 (e.g., a specific application, a specific method of code, a specific business process, a specific process flow, a specific process in a process flow) for performance analysis. Alternatively, the user may select multiple operations 320 or may indicate to analyze "All" operations 320. The user may select a specific metric 325, or category of performance data (e.g., processing time, processing overhead, memory resources, quantity of errors, frequency of errors), for analysis. Alternatively, the user may select multiple metrics 325 or may indicate to analyze "All" metrics 325. The application 305 may automatically apply a filter when the user inputs the filter (e.g., to improve the latency associated with performance analysis), or the application 305 may refrain from applying input filters until the user selects the submit button 330 or indicates another trigger to apply the filters (e.g., to reduce the overhead associated with querying and aggregating performance data).

The user interface 300 may display one or more integration metrics 335, for example, based on the filters input by the user. For example, the user interface 300 may display a quantity of API calls 340 (e.g., an approximate quantity or an exact quantity), a quantity of platform events 345, a quantity of asynchronous jobs 350, a quantity of callouts 355, or any combination of these or other integration metrics 335 (e.g., performance metrics corresponding to an integration of a specific application, product, extension, or code). In some examples, a user may configure which integration metrics 335 are displayed in the user interface 300. In some cases, the integration metrics 335 may be tracked and updated in realtime (or pseudo-realtime) as operations are performed for the tenant. Alternatively, the integration metrics 335 may be updated in response to a page reload or a selection of the submit button 330.

Additionally, or alternatively, the user interface 300 may display aggregated statistics 360. While the integration metrics 335 may indicate total quantities, the aggregated statistics 360 may indicate other information related to these total quantities. For example, the user interface 300 may present a total quantity of records processed 365 (e.g., for the API calls 340). The user interface 300 may present an average time taken 370 for completing execution of an API call of the API calls 340. In some examples, the user interface 300 may present an average job size 375, an average quantity of errors per job 380, or other aggregated statistics 360 providing additional information for the user viewing the user interface 300. The aggregated statistics 360 (e.g., aggregated historical statistics) may be specific to the tenant or may be aggregated across multiple tenants (e.g., without comprising any underlying tenant-specific data).

In some examples, the application 305 may use charts, tables, descriptions, or any other format to present performance data in the user interface 300. For example, the user interface 300 may include one or more donut charts indicating information for a tenant, information for multiple tenants, or information for a user. In some cases, a first chart may indicate a distribution of total operations 385 between insert operations, upsert operations, and delete operations. In some cases, a user may select, or hover a mouse over, a segment of the chart to view additional details relating to the specific segment. For example, selecting the upserts segment of the chart may allow the user to view more details relating to the upserts (e.g., a distribution of data object types, a quantity of errors associated with the upserts, a processing time associated with the upserts, relevant methods or process flows triggering the upserts). In some cases, a second chart may indicate a distribution of total results 390 for the operations, between successes, failures, and locks (e.g., row locks, table locks). In some cases, a third chart may indicate a distribution of API request times 395, showing the quantity of API requests that are handled in less than 20 seconds, the quantity of API requests that are handled between 20 and 300 seconds, and the quantity of API requests that are handled in over 300 seconds (although any time ranges may be supported). In some examples, a user may configure which charts are displayed in the user interface 300, how the charts are displayed (e.g., as donut charts, pie charts, bar charts, scatterplots, or any other format), or both. Additionally, or alternatively, the user may select which distribution metrics to use (e.g., the time windows for the distribution of API request times 395). The application 305 may use the performance data queried, aggregated, or both in response to the user input filters to create the charts, update the charts (e.g., in realtime, in pseudo-realtime, or in response to an update trigger), or both.

The user may access the user interface 300 to view performance data for a tenant (e.g., the tenant associated with the user). Additionally, or alternatively, the user interface 300 may support the user comparing the performance data for the tenant to one or more performance thresholds (e.g., set by the tenant or the multi-tenant database system), to the total set of tenants of the multi-tenant database system, or both. In some examples (e.g., if the user has sufficient access permissions), the user interface 300 may additionally support the user digging into the presented metrics. For example, the user interface 300 may link to specific portions of performance logs if the user selects to view additional details relating to a performance metric. Additionally, the user may identify changes in performance or historical trends associated with performance data using the user interface 300.

FIG. 4 illustrates an example of a user interface 400 that supports determining insights related to performance bottlenecks in a multi-tenant database system in accordance with aspects of the present disclosure. The user interface 400 may be implemented by the multi-tenant database system 205 described herein with reference to FIG. 2 and may support identifying performance bottlenecks in a multi-tenant, user-defined application. For example, the user interface 400 may provide insights (e.g., scale insights) based on performance data associated with an integration (e.g., an application, a product). For example, the user interface 400 may be displayed as part of a performance user interface 240 described herein with reference to FIG. 2. A user may access an application 405 (e.g., a tool for managing and analyzing tenant processes at scale, such as the Scale Center application) to view the user interface 400. In some cases, the application 405 may support multiple views, including an insights view (e.g., the user interface 400). The insights view may provide insights relating to performance bottlenecks to the user accessing the application 405.

The user interface 400 may provide a list of insights 410 (e.g., that describe performance bottlenecks) based on performance data associated with an integration 455 (e.g., an application, a product). For each insight 410, the user interface 400 may display a reason 415 for the insight 410 and a recommendation 420 of a corrective action the user may perform to reduce the effect of the insight 410. In addition, the user interface 400 may indicate a risk classification 425, a scalability score 430, a severity 435 (e.g., a severity level or criticality), a date created field 440, or a combination thereof. The user interface 400 may be an example user interface for presenting such information to a user. Additional, or alternative, user interface configurations may be implemented to support similar displays, functionality, or both.

In some examples, the insights 410 may be associated with a particular integration 455 (e.g., an implementation). For example, the insights 410 may correspond to an account update, an opportunity insert, a team allocation, new work created by month, or any other integration 455 or implementation associated with a set of tenants of a multi-tenant database system. An insight 410 may correspond to a performance metric of one or more aggregate performance metrics based on design time data for a tenant, runtime data for the tenant, or both. As such, a given insight 410 may, at least in part, contribute to a scalability score 430 associated with the integration 455.

In some cases, a reason 415 may indicate why a corresponding insight 410 may have occurred. In addition, a recommendation 420 may indicate one or more suggested actions a user may perform to change the scalability score 430. In some examples, a multi-tenant database system may predict a change to the scalability score 430 based on a change to code for a particular tenant, a change to a process of the tenant, or a combination thereof. The multi-tenant database system may then send, for display at the user interface 400, a suggested action corresponding to the change to the code, the change to the process, or the combination thereof, and an indication of the predicted change to the scalability score 430 corresponding to the suggested action. In some examples, the user (e.g., via the multi-tenant database system) may automatically perform the suggested action for an associated tenant based on the predicted change to the scalability score 430 corresponding to the suggested action. For example, if the predicted change is determined to be significant (e.g., as compared to a threshold), the suggested action may be automatically implemented.

For example, for an integration 455 associated with an account update, an insight 410-a may indicate a bulk API data load that may block urgent deployment work. The insight 410-a may correspond to a reason 415-a indicating one or more record lock (e.g., row lock) errors associated with the bulk API data load. In addition, a recommendation 420-a associated with the insight 410-a and the reason 415-a may indicate corrective actions the user may perform to reduce the record lock errors, which may include sorting data records, disabling conflicting integrations (e.g., other integrations that may conflict with the integration 455), or both.

Additionally, or alternatively, the integration 455 may be associated with an insight 410-b, which may indicate that bulk data load jobs reached a limit. A reason 415-b associated with the insight 410-b may indicate that the limits were reached because a low batch size was used. Accordingly, a recommendation 420-b for improving the insight 410-b may indicate corrective actions such as using more efficient batch sizes, moving to a different bulk data load procedure (e.g., bulk V2), or both. In some cases, the integration 455 may additionally be associated with an insight 410-c, which may indicate an occurrence of slow bulk data loads and batch jobs. A reason 415-c associated with the insight 410-c may indicate that it may have taken too much time (e.g., 70 hours) to complete the slow bulk data loads and batch jobs in a sandbox environment. In addition, a recommendation 420-c for improving the insight 410-c may indicate corrective actions such as using operators such as "equals" or "contains," optimizing a batch job for faster execution, or both.

In some examples, the user interface 400 may display the scalability score 430, which may be based on one or more of the insights 410. For example, a multi-tenant database system may compare the insights 410 (e.g., one or more aggregate performance metrics) to one or more performance thresholds defined for multiple tenants of the multi-tenant database system. Based on the comparison, the multi-tenant database system may generate the scalability score 430 indicating the current overall performance of the integration 455 when compared to the one or more performance thresholds. The scalability score 430 may be displayed as a percentage (e.g., 91.4%), a numerical value (e.g., 4 out of 5), a category, or the like. In addition, the severity 435 may indicate a criticality of performing a suggested action of a recommendation 420. For example, the severity 435 may indicate that it is critical for the user to perform the suggested action, or the severity 435 may indicate a warning, or that performing the suggested action is not critical, among other indications of severity.

In some examples, the risk classification 425 may indicate how many data logs (e.g., data records) of a set of data logs are associated with a given insight 410 for the integration 455. Specifically, the risk classification 425 may indicate a quantity of data logs corresponding to one or more aggregate performance metrics that fail to satisfy one or more performance thresholds. For example, if the integration 455 is associated with an account update, the risk classification 425 may indicate that out of 2,000 account record updates, 75 records encountered row lock errors (e.g., corresponding to the insight 410-a). Additionally, or alternatively, the user interface 400 may indicate a date created field 440 indicating a date and a time at which the scalability score 430 was generated.

A user may choose to ignore or fix an issue associated with the insight 410. For example, the user may select an ignore button 445 via the user interface 400, which may indicate that the user is refraining from following a recommendation 420 for a particular insight 410. Alternatively, the user may select a fix issue button 450, which may indicate that the system is to perform a corrective action following a recommendation 420 to mitigate issues associated with an insight 410. For example, selection of the fix issue button 450 may trigger the system to perform one or more actions associated with a recommendation 420. Alternatively, the system may automatically perform one or more actions (e.g., associated with a recommendation 420) without user input, for example, if the system is configured to automatically handle some performance bottlenecks.

In some cases, the application 405 may additionally support a resources view (e.g., in a user interface). The resources view may provide resources the user may reference to learn more about organization scalability and performance as it relates to integrations on a platform (e.g., a CRM service). The user interface may support a resource for exploring integration, which may enable a user to learn about integration and a bulk API and how it may be optimized for working with relatively large sets of data (e.g., integration at scale). The user interface may support a resource for viewing bulk API documentation, which may enable the user to discover bulk APIs and understand how they may be used to build scalable implementations. Additionally, or alternatively, the user interface may support a resource about learning from an administrative community, which may allow the user to ask questions and receive answers, learn best practices, and share experiences with other users (e.g., associated with the same tenants or with other tenants).

Figure 5:
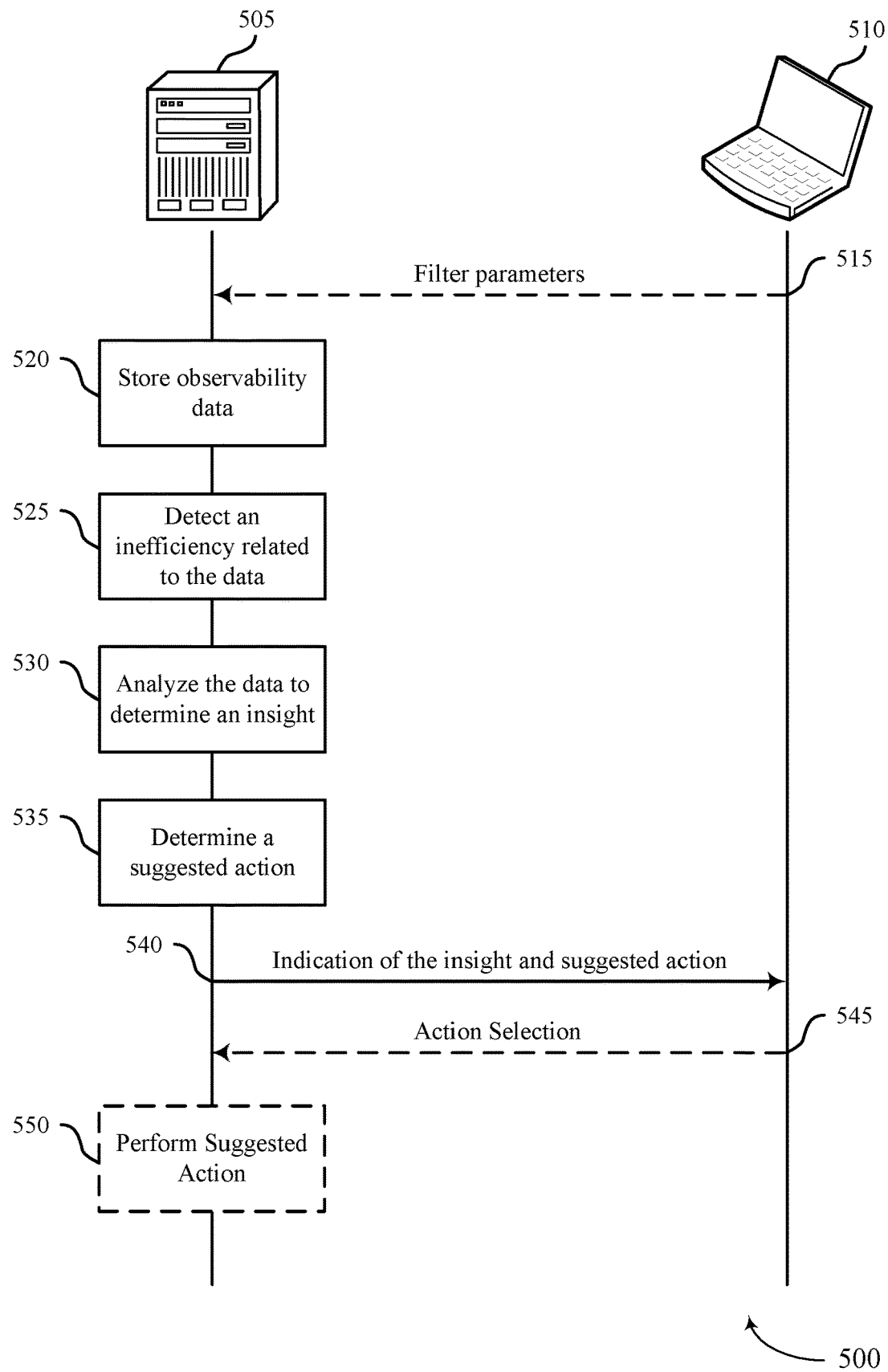
FIG. 5 illustrates an example of a process flow that supports determining insights related to performance bottlenecks in a multi-tenant database system in accordance with aspects of the present disclosure.

FIG. 5 illustrates an example of a process flow 500 that supports determining insights related to performance bottlenecks in a multi-tenant database system in accordance with aspects of the present disclosure. The process flow 500 may implement aspects of the system 200 or may be implemented by aspects of the system 200. The process flow 500 may include a system 505 and a user device 510. The system 505 may be an example of any processing device, such as a server, server cluster, application server, database server, worker server, cloud-based component, virtual machine, container, database, user device, or system of devices capable of processing data, or one or more components of such a processing device. In the following description of the process flow 500, the operations between the system 505 and the user device 510 may be performed in different orders or at different times. Some operations may also be left out of the process flow 500, or other operations may be added. Although the system 505 and the user device 510 are shown performing the operations of the process flow 500, some aspects of some operations may be performed by one or more other devices.

In some examples, at 515, the system 505 (e.g., a multi-tenant database system) may receive a user input from the user device 510 via a user interface. For example, the user operating the user device 510 may input one or more filter parameters for filtering performance analysis. In some cases, the system 505 may receive, via the user interface of the user device 510, a user input indicating a threshold time window for analysis of tenant-specific observability data. Additionally, or alternatively, the user may input other filter parameters, such as specific data objects, operations, performance metrics, applications, integrations, or any other parameters for analysis.

At 520, the system 505 may store tenant-specific observability data for multiple tenants of the system 505. In some cases, the tenant-specific observability data for a tenant may include a set of data logs for the tenant, a set of data transactions for the tenant, a set of user requests performed by users of the tenant, a set of distributed traces for the tenant, profiling data for the tenant, a first set of performance metrics associated with bulk data loading for the tenant, a second set of performance metrics associated with bulk data transfer for the tenant, or a combination thereof. Additionally, or alternatively, the system 505 may store, with the tenant-specific observability data, a set of identifiers, where a data point of the tenant-specific observability data is associated with an identifier of the set of identifiers indicating a respective tenant of the multiple tenants. The tenant-specific observability data may correspond to multiple layers of the multi-tenant database system, and the identifiers may provide associations across layers for the tenant-specific observability data.

At 525, the system 505 may detect an inefficiency corresponding to a performance metric for a tenant of the multiple tenants based on a subset of the tenant-specific observability data associated with the tenant and corresponding to a threshold time window (e.g., the threshold time window indicated by the user at 515 or another threshold time window configured for the system 505). In some cases, the inefficiency corresponding to the performance metric may involve a processing time exceeding a threshold processing time, a quantity of processing resources exceeding a threshold quantity of processing resources, a quantity of memory resources exceeding a threshold quantity of memory resources, a quantity of errors exceeding a threshold quantity of errors, or a combination thereof. One or more of these thresholds may be user-configured, tenant-configured, configured for the multi-tenant database system, determined dynamically (e.g., based on performance metrics for the tenant or performance metrics across tenants), or any combination thereof. In some examples, the system 505 may determine the subset of the tenant-specific observability data based on the set of identifiers, where each data point of the subset of the tenant-specific observability data is associated with a first identifier indicating the tenant from the multiple tenants.

At 530, the system 505 may analyze the subset of the tenant-specific observability data for the threshold time window to determine an insight indicating a cause of the inefficiency. In some cases, the insight may indicate that a query is executed at a first frequency greater than a first threshold frequency, the query consumes a quantity of resources greater than a threshold quantity of resources, the query makes a quantity of calls to the multi-tenant database system exceeding a threshold quantity of calls, a page is loaded at a second frequency greater than a second threshold frequency, first code related to a custom component for the tenant comprises one or more first inefficient portions, second code related to a process flow for the tenant comprises one or more second inefficient portions, one or more variable values used for a portion of code cause the inefficiency, one or more detected anomalies cause the inefficiency, or a combination thereof. One or more of these thresholds may be user-configured, tenant-configured, configured for the multi-tenant database system, determined dynamically (e.g., based on performance metrics for the tenant or performance metrics across tenants), or any combination thereof.

At 535, the system 505 may determine a suggested action for the tenant based on the insight indicating the cause of the inefficiency. At 540, the system 505 may send, for display at a user interface of the user device 510, an indication of the insight and the suggested action. The user device 510 may be operated by a user associated with the tenant.

In some examples, at 545, the user device 510 may indicate an action selection to the system 505. For example, the user may select a suggested action to perform via the user interface. The system 505 may receive, via the user interface of the user device 510, a user input indicating the selection of the suggested action.

In some examples, at 550, the system 505 may perform the suggested action for the tenant. In some cases, the system 505 may perform the suggested action in response to the user input received at 545. In some other cases, the system 505 may automatically perform the suggested action for the tenant (e.g., without user interaction) based on determining the suggested action.

In some cases, performing the suggested action may involve disabling an integration, an application, an extension, or a combination thereof for the tenant. Additionally, or alternatively, performing the suggested action may involve modifying a bulk data load procedure for the tenant from a first version to a second version, modifying one or more operators in code associated with the tenant, rolling back an update to code associated with the tenant, updating a database schema for the tenant at the multi-tenant database system, updating a batch size for a batch processing job performed for the tenant, or any combination thereof. In some cases, the system 505 may aggregate multiple insights corresponding to multiple tenants (e.g., at least two tenants) and may update the multi-tenant database system (e.g., for the set of tenants supported by the system) based on the aggregated insights. Accordingly, the multi-tenant database system may identify performance bottlenecks and corresponding insights that affect multiple tenants and may update the entire system (e.g., rather than for a single tenant) to mitigate such performance bottlenecks for the tenants.

In some cases, the system 505 may receive, via the user interface of the user device 510, a user input defining code for the tenant. The system 505 may tag the code with an indication of the tenant, where the system 505 may analyze the tenant-specific observability data based on analyzing the code tagged with the indication of the tenant.

Figure 6:
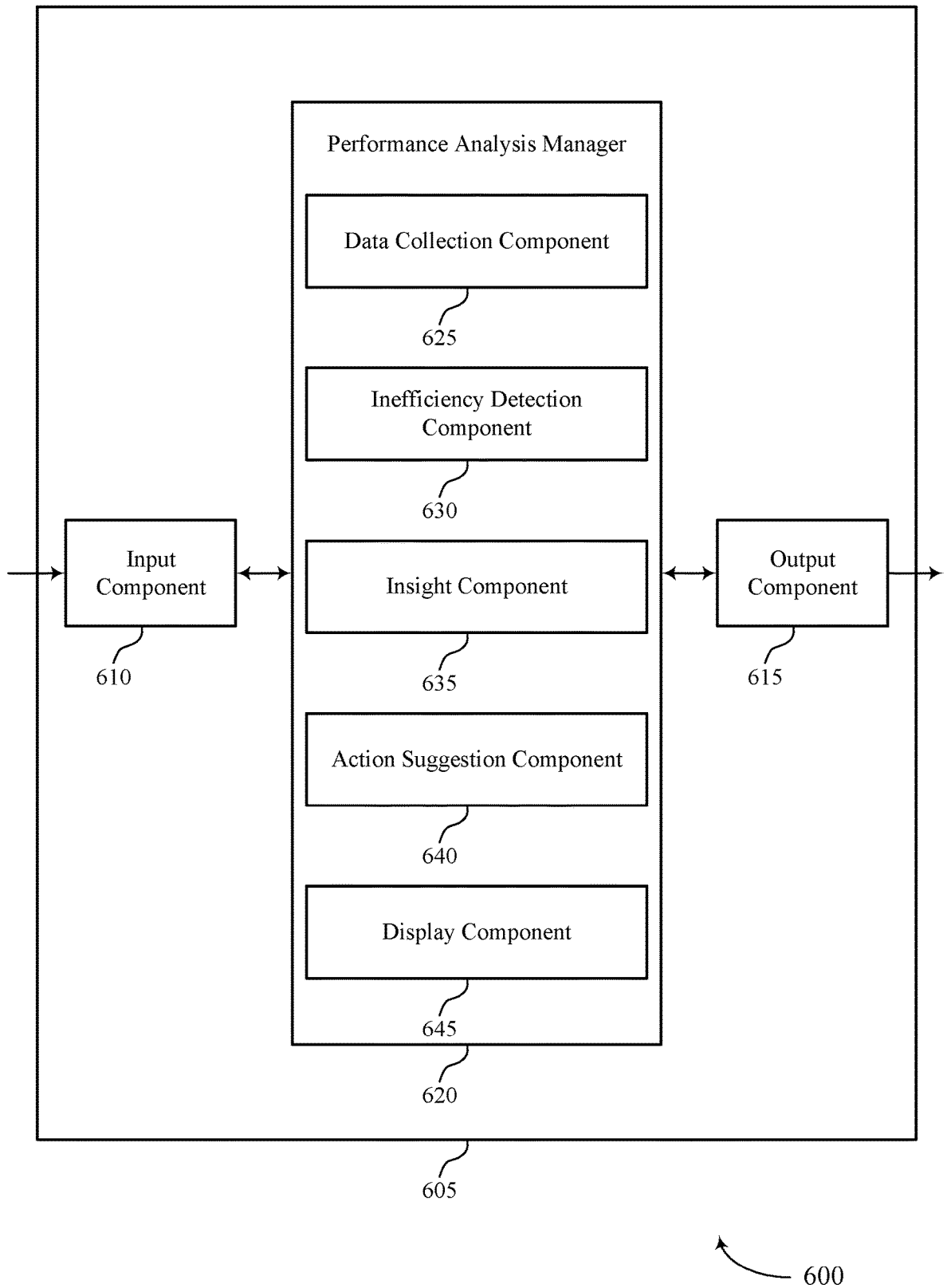
FIGS. 6 and 7 show block diagrams of an apparatus that supports determining insights related to performance bottlenecks in a multi-tenant database system in accordance with aspects of the present disclosure.

FIG. 6 shows a block diagram 600 of a device 605 that supports determining insights related to performance bottlenecks in a multi-tenant database system in accordance with aspects of the present disclosure. The device 605 may include an input component 610, an output component 615, and a performance analysis manager 620. The device 605 may also include a processor. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-WINDOWS®, OS/2®, UNIX®, LINUX®, or another known operating system to handle input signals. The input component 610 may send aspects of these input signals to other components of the device 605 for processing. For example, the input component 610 may transmit input signals to the performance analysis manager 620 to support determining insights related to performance bottlenecks in a multi-tenant database system. In some cases, the input component 610 may be a component of an input/output (I/O) controller 810 as described with reference to FIG. 8.

The output component 615 may manage output signals for the device 605. For example, the output component 615 may receive signals from other components of the device 605, such as the performance analysis manager 620, and may transmit these signals to other components or devices. In some examples, the output component 615 may transmit output signals for display in a user interface, for storage in a database or data store, for further processing at a server or server cluster, or for any other processes at any number of devices or systems. In some cases, the output component 615 may be a component of an I/O controller 810 as described with reference to FIG. 8.

For example, the performance analysis manager 620 may include a data collection component 625, an inefficiency detection component 630, an insight component 635, an action suggestion component 640, a display component 645, or any combination thereof. In some examples, the performance analysis manager 620, or various components thereof, may be configured to perform various operations (e.g., receiving, monitoring, transmitting) using or otherwise in cooperation with the input component 610, the output component 615, or both. For example, the performance analysis manager 620 may receive information from the input component 610, send information to the output component 615, or be integrated in combination with the input component 610, the output component 615, or both to receive information, transmit information, or perform various other operations as described herein.

The performance analysis manager 620 may support determining insights related to performance at a multi-tenant database system in accordance with examples as disclosed herein. The data collection component 625 may be configured to support storing tenant-specific observability data for a plurality of tenants of the multi-tenant database system. The inefficiency detection component 630 may be configured to support detecting an inefficiency corresponding to a performance metric for a tenant of the plurality of tenants based at least in part on a subset of the tenant-specific observability data associated with the tenant and corresponding to a threshold time window. The insight component 635 may be configured to support analyzing the subset of the tenant-specific observability data for the threshold time window to determine an insight indicating a cause of the inefficiency. The action suggestion component 640 may be configured to support determining a suggested action for the tenant based at least in part on the insight indicating the cause of the inefficiency. The display component 645 may be configured to support sending, for display at a user interface of a user device, an indication of the insight and the suggested action, the user device operated by a user associated with the tenant.

In some examples, the data collection component 625, the inefficiency detection component 630, the insight component 635, the action suggestion component 640, the display component 645, or any combination thereof may use one or more thresholds to support performing the operations described herein. For example, a component may store a threshold value or may be configured with a threshold value for triggering an operation. In some examples, the performance analysis manager 620 may store, track, update, or otherwise use one or more thresholds (e.g., performance thresholds, inefficiency thresholds, insight thresholds, action thresholds) that may be tenant-specific or may be associated with any tenants of the multi-tenant database system. A threshold may indicate a level of performance for a tenant to exceed, a level of performance below which the performance analysis manager 620 may suggest one or more corrective actions, a level of performance defined as a "performance bottleneck," or any combination thereof. In some examples, the threshold may be associated with any performance metric for a tenant, such as a threshold quantity of processing resources used for a procedure, a threshold quantity of memory resources used for the procedure, a threshold processing latency associated with executing the procedure, a threshold quantity of errors encountered for the procedure, or any combination of these or other thresholds. Additionally, or alternatively, the component may use another trigger (e.g., a trigger function) or trigger state (e.g., instead of one or more thresholds) to trigger an operation.

Figure 7:
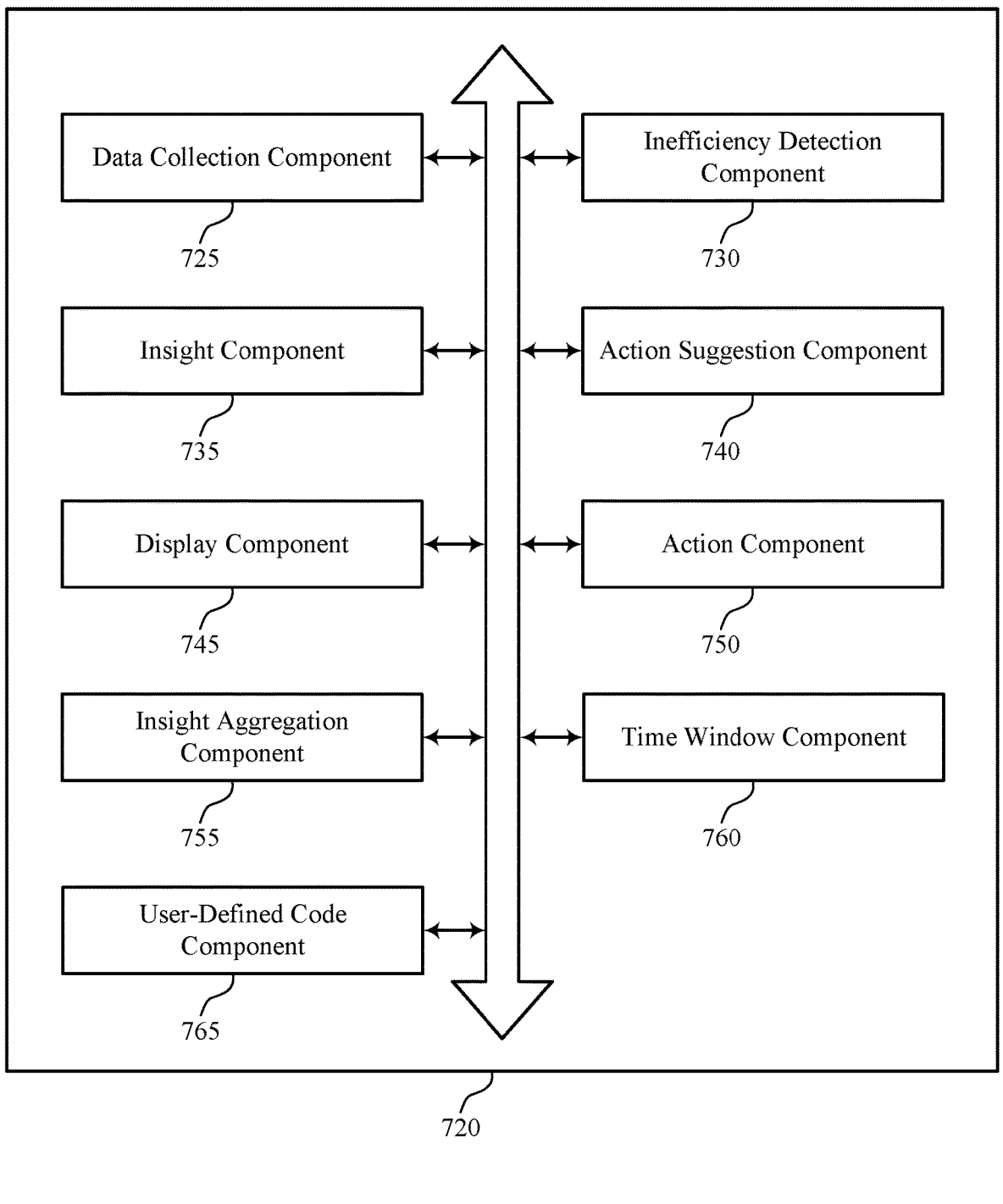

FIG. 7 shows a block diagram 700 of a performance analysis manager 720 that supports determining insights related to performance bottlenecks in a multi-tenant database system in accordance with aspects of the present disclosure. The performance analysis manager 720 may be an example of aspects of a performance analysis manager 620, as described herein. In some examples, the performance analysis manager 720, or various components thereof, may support performing various aspects of determining insights related to performance bottlenecks in a multi-tenant database system as described herein. For example, the performance analysis manager 720 may include a data collection component 725, an inefficiency detection component 730, an insight component 735, an action suggestion component 740, a display component 745, an action component 750, an insight aggregation component 755, a time window component 760, a user-defined code component 765, or any combination thereof. Each of these components may communicate, directly or indirectly, with one another (e.g., via one or more buses).

The performance analysis manager 720 may support determining insights related to performance at a multi-tenant database system in accordance with examples as disclosed herein. The data collection component 725 may be configured to support storing tenant-specific observability data for a plurality of tenants of the multi-tenant database system. The inefficiency detection component 730 may be configured to support detecting an inefficiency corresponding to a performance metric for a tenant of the plurality of tenants based at least in part on a subset of the tenant-specific observability data associated with the tenant and corresponding to a threshold time window. The insight component 735 may be configured to support analyzing the subset of the tenant-specific observability data for the threshold time window to determine an insight indicating a cause of the inefficiency. The action suggestion component 740 may be configured to support determining a suggested action for the tenant based at least in part on the insight indicating the cause of the inefficiency. The display component 745 may be configured to support sending, for display at a user interface of a user device, an indication of the insight and the suggested action, the user device operated by a user associated with the tenant.

In some examples, the action component 750 may be configured to support receiving, via the user interface of the user device, a user input indicating a selection of the suggested action. In some examples, the action component 750 may be configured to support performing the suggested action for the tenant in response to the user input.

In some examples, the action component 750 may be configured to support automatically performing the suggested action for the tenant based at least in part on determining the suggested action.

In some examples, the time window component 760 may be configured to support receiving, via the user interface of the user device, a user input indicating the threshold time window for detection, wherein the subset of the tenant-specific observability data is based at least in part on the user input indicating the threshold time window.

In some examples, the data collection component 725 may be configured to support storing, with the tenant-specific observability data, a plurality of identifiers, wherein a data point of the tenant-specific observability data is associated with an identifier of the plurality of identifiers indicating a respective tenant of the plurality of tenants, and the tenant-specific observability data corresponds to a plurality of layers of the multi-tenant database system. In some examples, the inefficiency detection component 730 may be configured to support determining the subset of the tenant-specific observability data based at least in part on the plurality of identifiers, wherein each data point of the subset of the tenant-specific observability data is associated with a first identifier indicating the tenant of the plurality of tenants.

In some examples, the user-defined code component 765 may be configured to support receiving, via the user interface of the user device, a user input defining code for the tenant and tagging the code with an indication of the tenant, wherein analyzing the subset of the tenant-specific observability data for the threshold time window further comprises analyzing the code tagged with the indication of the tenant.

In some examples, the action component 750 may be configured to support disabling an integration, an application, an extension, or a combination thereof for the tenant based at least in part on the suggested action.

In some examples, the inefficiency may be associated with a bulk data load procedure for the tenant, and the action component 750 may be configured to support modifying the bulk data load procedure from a first version to a second version based at least in part on the suggested action.

In some examples, the action component 750 may be configured to support modifying one or more operators in code associated with the tenant based at least in part on the suggested action. In some examples, the inefficiency may be associated with an update to code associated with the tenant, and the action component 750 may be configured to support rolling back the update to the code based at least in part on the suggested action.

In some examples, the inefficiency may be associated with a database schema for the tenant at the multi-tenant database system, and the action component 750 may be configured to support updating the database schema for the tenant at the multi-tenant database system based at least in part on the suggested action.

In some examples, the inefficiency may be associated with a batch size for a batch processing job, and the action component 750 may be configured to support updating the batch size for the batch processing job based at least in part on the suggested action.

In some examples, the tenant-specific observability data comprises a set of data logs for the tenant, a set of data transactions for the tenant, a set of user requests performed by users of the tenant, a set of distributed traces for the tenant, profiling data for the tenant, a first set of performance metrics associated with bulk data loading for the tenant, a second set of performance metrics associated with bulk data transfer for the tenant, or a combination thereof.

In some examples, the inefficiency corresponding to the performance metric comprises a processing time exceeding a threshold processing time, a quantity of processing resources exceeding a threshold quantity of processing resources, a quantity of memory resources exceeding a threshold quantity of memory resources, a quantity of errors exceeding a threshold quantity of errors, or a combination thereof.

In some examples, the insight indicating the cause of the inefficiency indicates that a query is executed at a first frequency greater than a first threshold frequency, the query consumes a quantity of resources greater than a threshold quantity of resources, the query makes a quantity of calls to the multi-tenant database system exceeding a threshold quantity of calls, a page is loaded at a second frequency greater than a second threshold frequency, first code related to a custom component for the tenant comprises one or more first inefficient portions, second code related to a process flow for the tenant comprises one or more second inefficient portions, one or more variable values used for a portion of code cause the inefficiency, one or more detected anomalies cause the inefficiency, or a combination thereof.

In some examples, the insight aggregation component 755 may be configured to support aggregating a plurality of insights corresponding to at least two tenants of the plurality of tenants. In some examples, the insight aggregation component 755 may be configured to support updating the multi-tenant database system for the plurality of tenants based at least in part on the aggregated plurality of insights.

Figure 8:
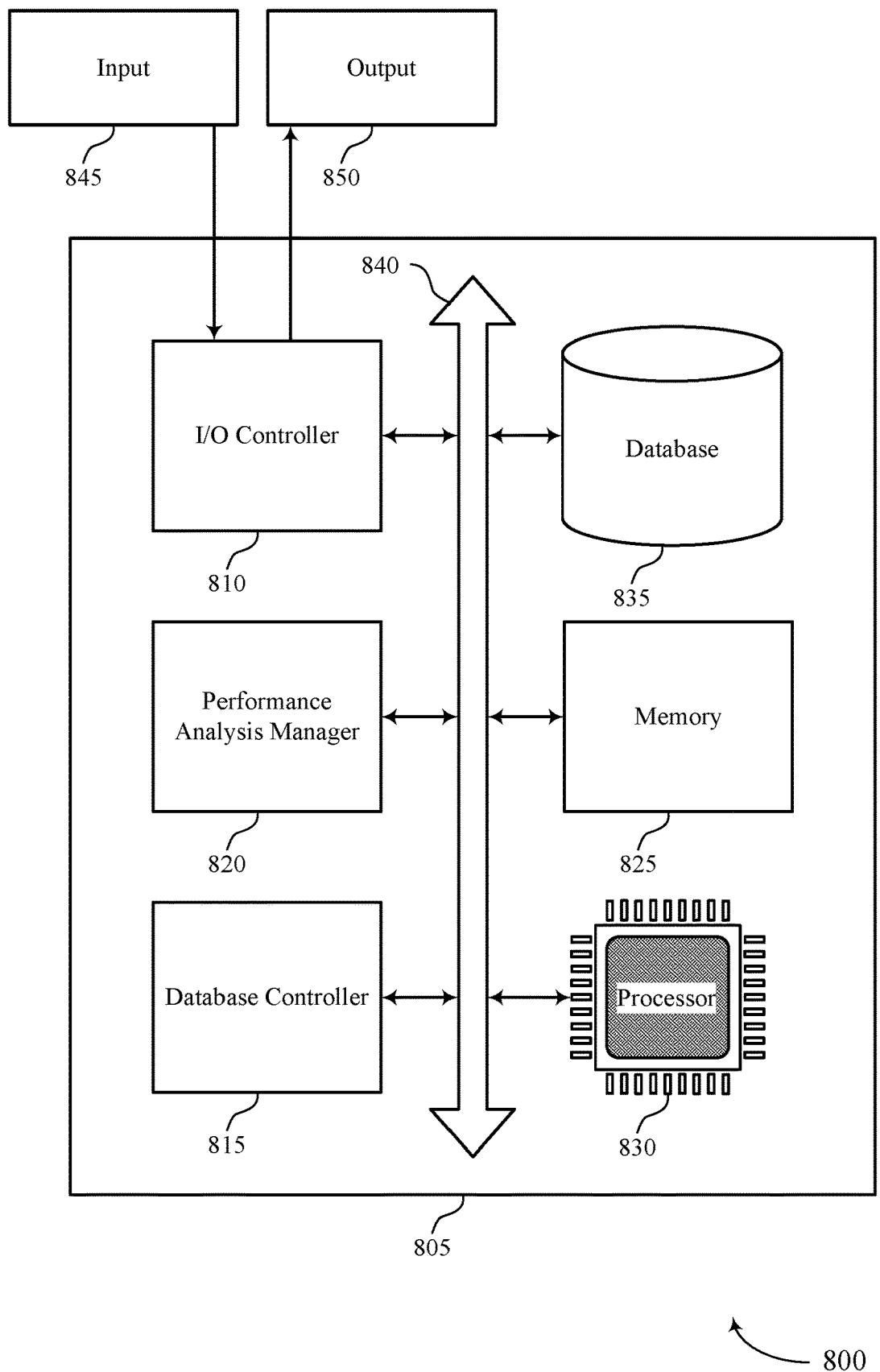
FIG. 8 shows a diagram of a system including a device that supports determining insights related to performance bottlenecks in a multi-tenant database system in accordance with aspects of the present disclosure.

FIG. 8 shows a diagram of a system 800 including a device 805 that supports determining insights related to performance bottlenecks in a multi-tenant database system in accordance with aspects of the present disclosure. The device 805 may be an example of or include the components of a device 605 as described herein. The device 805 may include components for bi-directional data communications including components for transmitting and receiving communications, such as a performance analysis manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a digital signal processor (DSP), a CPU, a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting determining insights related to performance bottlenecks in a multi-tenant database system).

The performance analysis manager 820 may support determining insights related to performance at a multi-tenant database system in accordance with examples as disclosed herein. For example, the performance analysis manager 820 may be configured to support storing tenant-specific observability data for a plurality of tenants of the multi-tenant database system. The performance analysis manager 820 may be configured to support detecting an inefficiency corresponding to a performance metric for a tenant of the plurality of tenants based at least in part on a subset of the tenant-specific observability data associated with the tenant and corresponding to a threshold time window. The performance analysis manager 820 may be configured to support analyzing the subset of the tenant-specific observability data for the threshold time window to determine an insight indicating a cause of the inefficiency. The performance analysis manager 820 may be configured to support determining a suggested action for the tenant based at least in part on the insight indicating the cause of the inefficiency. The performance analysis manager 820 may be configured to support sending, for display at a user interface of a user device, an indication of the insight and the suggested action, the user device operated by a user associated with the tenant.

Figure 9:
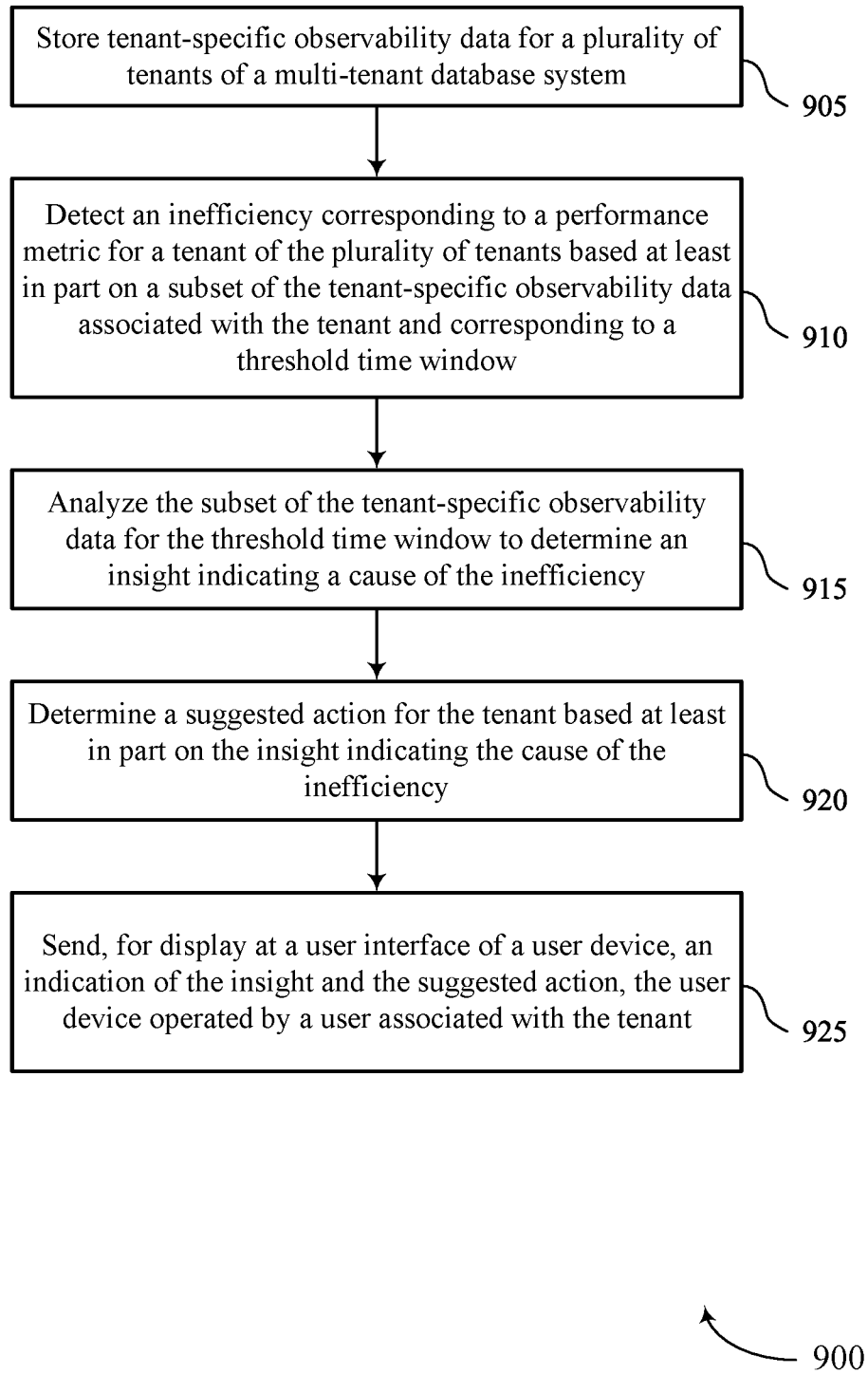
FIGS. 9 through 11 show flowcharts illustrating methods that support determining insights related to performance bottlenecks in a multi-tenant database system in accordance with aspects of the present disclosure.

FIG. 9 shows a flowchart illustrating a method 900 that supports determining insights related to performance bottlenecks in a multi-tenant database system in accordance with aspects of the present disclosure. The operations of the method 900 may be implemented by a processing device (e.g., a server, server cluster, application server, database server, worker server, cloud-based component, virtual machine, container, database, user device, or system of devices capable of processing data) or its components as described herein. For example, the operations of the method 900 may be performed by a processing device (e.g., a component of a multi-tenant database system) as described with reference to FIGS. 1 through 8. In some examples, a processing device may execute a set of instructions to control the functional elements of the processing device to perform the described functions. Additionally or alternatively, the processing device may perform aspects of the described functions using special-purpose hardware.

At 905, the method may include storing tenant-specific observability data for a plurality of tenants of a multi-tenant database system. The operations of 905 may be performed in accordance with examples as disclosed herein. In some examples, aspects of the operations of 905 may be performed by a data collection component 725 as described with reference to FIG. 7.

At 910, the method may include detecting an inefficiency corresponding to a performance metric for a tenant of the plurality of tenants based at least in part on a subset of the tenant-specific observability data associated with the tenant and corresponding to a threshold time window. The operations of 910 may be performed in accordance with examples as disclosed herein. In some examples, aspects of the operations of 910 may be performed by an inefficiency detection component 730 as described with reference to FIG. 7.

At 915, the method may include analyzing the subset of the tenant-specific observability data for the threshold time window to determine an insight indicating a cause of the inefficiency. The operations of 915 may be performed in accordance with examples as disclosed herein. In some examples, aspects of the operations of 915 may be performed by an insight component 735 as described with reference to FIG. 7.

At 920, the method may include determining a suggested action for the tenant based at least in part on the insight indicating the cause of the inefficiency. The operations of 920 may be performed in accordance with examples as disclosed herein. In some examples, aspects of the operations of 920 may be performed by an action suggestion component 740 as described with reference to FIG. 7.

At 925, the method may include sending, for display at a user interface of a user device, an indication of the insight and the suggested action, the user device operated by a user associated with the tenant. The operations of 925 may be performed in accordance with examples as disclosed herein. In some examples, aspects of the operations of 925 may be performed by a display component 745 as described with reference to FIG. 7.

Figure 10:
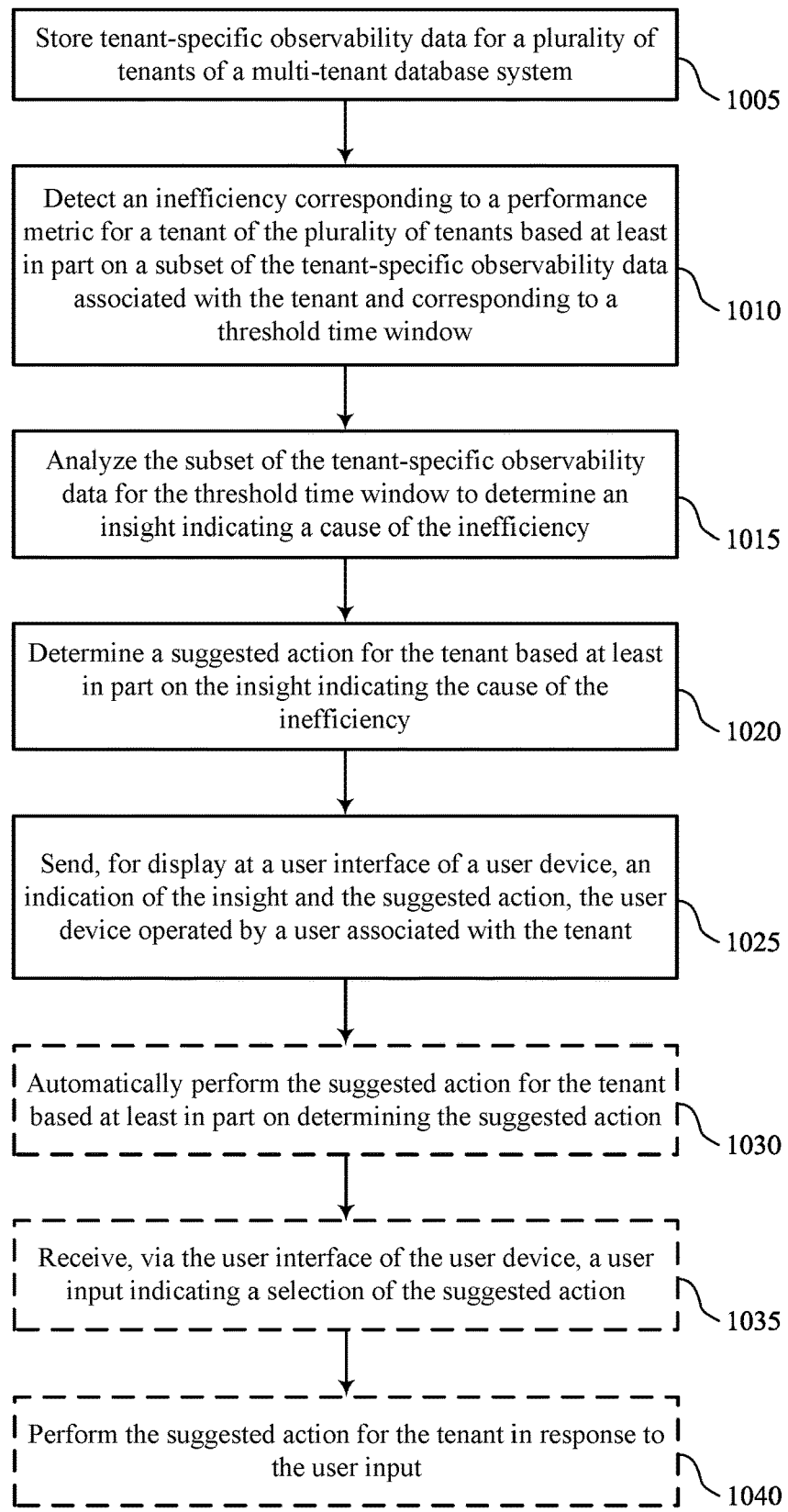

FIG. 10 shows a flowchart illustrating a method 1000 that supports determining insights related to performance bottlenecks in a multi-tenant database system in accordance with aspects of the present disclosure. The operations of the method 1000 may be implemented by a processing device (e.g., a server, server cluster, application server, database server, worker server, cloud-based component, virtual machine, container, database, user device, or system of devices capable of processing data) or its components as described herein. For example, the operations of the method 1000 may be performed by a processing device (e.g., a component of a multi-tenant database system) as described with reference to FIGS. 1 through 8. In some examples, a processing device may execute a set of instructions to control the functional elements of the processing device to perform the described functions. Additionally, or alternatively, the processing device may perform aspects of the described functions using special-purpose hardware.

At 1005, the method may include storing tenant-specific observability data for a plurality of tenants of a multi-tenant database system. The operations of 1005 may be performed in accordance with examples as disclosed herein. In some examples, aspects of the operations of 1005 may be performed by a data collection component 725 as described with reference to FIG. 7.

At 1010, the method may include detecting an inefficiency corresponding to a performance metric for a tenant of the plurality of tenants based at least in part on a subset of the tenant-specific observability data associated with the tenant and corresponding to a threshold time window. The operations of 1010 may be performed in accordance with examples as disclosed herein. In some examples, aspects of the operations of 1010 may be performed by an inefficiency detection component 730 as described with reference to FIG. 7.

At 1015, the method may include analyzing the subset of the tenant-specific observability data for the threshold time window to determine an insight indicating a cause of the inefficiency. The operations of 1015 may be performed in accordance with examples as disclosed herein. In some examples, aspects of the operations of 1015 may be performed by an insight component 735 as described with reference to FIG. 7.

At 1020, the method may include determining a suggested action for the tenant based at least in part on the insight indicating the cause of the inefficiency. The operations of 1020 may be performed in accordance with examples as disclosed herein. In some examples, aspects of the operations of 1020 may be performed by an action suggestion component 740 as described with reference to FIG. 7.

At 1025, the method may include sending, for display at a user interface of a user device, an indication of the insight and the suggested action, the user device operated by a user associated with the tenant. The operations of 1025 may be performed in accordance with examples as disclosed herein. In some examples, aspects of the operations of 1025 may be performed by a display component 745 as described with reference to FIG. 7.

In some examples, at 1030, the method may include automatically performing the suggested action for the tenant based at least in part on determining the suggested action. The operations of 1030 may be performed in accordance with examples as disclosed herein. In some examples, aspects of the operations of 1030 may be performed by an action component 750 as described with reference to FIG. 7.

In some other examples, at 1035, the method may include receiving, via the user interface of the user device, a user input indicating a selection of the suggested action. The operations of 1035 may be performed in accordance with examples as disclosed herein. In some examples, aspects of the operations of 1035 may be performed by an action component 750 as described with reference to FIG. 7.

In some such other examples, at 1040, the method may include performing the suggested action for the tenant in response to the user input. The operations of 1040 may be performed in accordance with examples as disclosed herein. In some examples, aspects of the operations of 1040 may be performed by an action component 750 as described with reference to FIG. 7.

Figure 11:
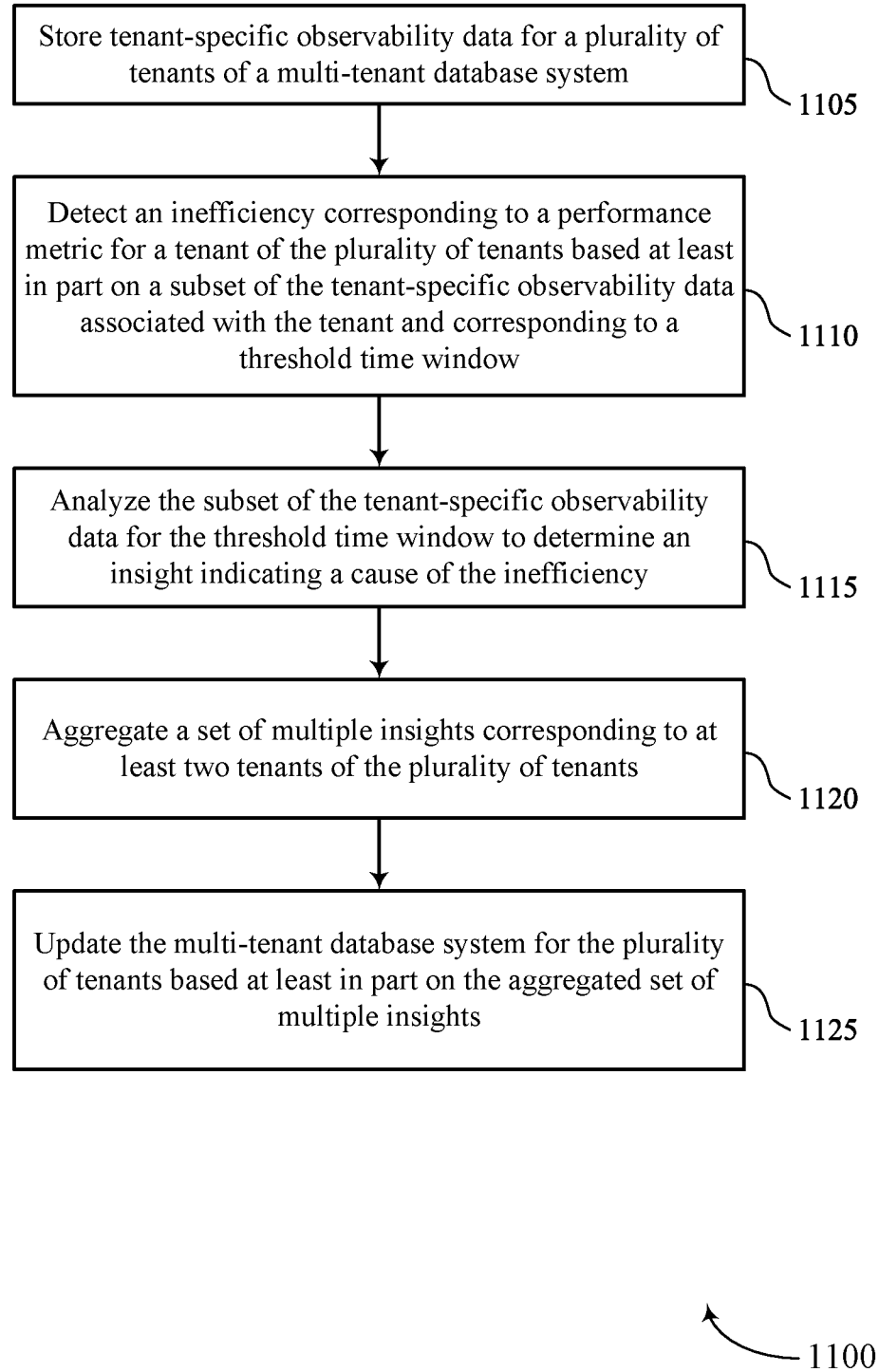

FIG. 11 shows a flowchart illustrating a method 1100 that supports determining insights related to performance bottlenecks in a multi-tenant database system in accordance with aspects of the present disclosure. The operations of the method 1100 may be implemented by a processing device (e.g., a server, server cluster, application server, database server, worker server, cloud-based component, virtual machine, container, database, user device, or system of devices capable of processing data) or its components as described herein. For example, the operations of the method 1100 may be performed by a processing device (e.g., a component of a multi-tenant database system) as described with reference to FIGS. 1 through 8. In some examples, a processing device may execute a set of instructions to control the functional elements of the processing device to perform the described functions. Additionally, or alternatively, the processing device may perform aspects of the described functions using special-purpose hardware.

At 1105, the method may include storing tenant-specific observability data for a plurality of tenants of a multi-tenant database system. The operations of 1105 may be performed in accordance with examples as disclosed herein. In some examples, aspects of the operations of 1105 may be performed by a data collection component 725 as described with reference to FIG. 7.

At 1110, the method may include detecting an inefficiency corresponding to a performance metric for a tenant of the plurality of tenants based at least in part on a subset of the tenant-specific observability data associated with the tenant and corresponding to a threshold time window. The operations of 1110 may be performed in accordance with examples as disclosed herein. In some examples, aspects of the operations of 1110 may be performed by an inefficiency detection component 730 as described with reference to FIG. 7.

At 1115, the method may include analyzing the subset of the tenant-specific observability data for the threshold time window to determine an insight indicating a cause of the inefficiency. The operations of 1115 may be performed in accordance with examples as disclosed herein. In some examples, aspects of the operations of 1115 may be performed by an insight component 735 as described with reference to FIG. 7.

At 1120, the method may include aggregating a set of multiple insights corresponding to at least two tenants of the plurality of tenants. The operations of 1120 may be performed in accordance with examples as disclosed herein. In some examples, aspects of the operations of 1120 may be performed by an insight aggregation component 755 as described with reference to FIG. 7.

At 1125, the method may include updating the multi-tenant database system for the plurality of tenants based at least in part on the aggregated set of multiple insights. The operations of 1125 may be performed in accordance with examples as disclosed herein. In some examples, aspects of the operations of 1125 may be performed by an insight aggregation component 755 as described with reference to FIG. 7.

A method for determining insights related to performance at a multi-tenant database system is described. The method may include storing tenant-specific observability data for a plurality of tenants of the multi-tenant database system, detecting an inefficiency corresponding to a performance metric for a tenant of the plurality of tenants based at least in part on a subset of the tenant-specific observability data associated with the tenant and corresponding to a threshold time window, analyzing the subset of the tenant-specific observability data for the threshold time window to determine an insight indicating a cause of the inefficiency, determining a suggested action for the tenant based at least in part on the insight indicating the cause of the inefficiency, and sending, for display at a user interface of a user device, an indication of the insight and the suggested action, the user device operated by a user associated with the tenant.

An apparatus for determining insights related to performance at a multi-tenant database system is described. The apparatus may include a processor, memory coupled with the processor, and instructions stored in the memory. The instructions may be executable by the processor to cause the apparatus to store tenant-specific observability data for a plurality of tenants of the multi-tenant database system, detect an inefficiency corresponding to a performance metric for a tenant of the plurality of tenants based at least in part on a subset of the tenant-specific observability data associated with the tenant and corresponding to a threshold time window, analyze the subset of the tenant-specific observability data for the threshold time window to determine an insight indicating a cause of the inefficiency, determine a suggested action for the tenant based at least in part on the insight indicating the cause of the inefficiency, and send, for display at a user interface of a user device, an indication of the insight and the suggested action, the user device operated by a user associated with the tenant.

Another apparatus for determining insights related to performance at a multi-tenant database system is described. The apparatus may include means for storing tenant-specific observability data for a plurality of tenants of the multi-tenant database system, means for detecting an inefficiency corresponding to a performance metric for a tenant of the plurality of tenants based at least in part on a subset of the tenant-specific observability data associated with the tenant and corresponding to a threshold time window, means for analyzing the subset of the tenant-specific observability data for the threshold time window to determine an insight indicating a cause of the inefficiency, means for determining a suggested action for the tenant based at least in part on the insight indicating the cause of the inefficiency, and means for sending, for display at a user interface of a user device, an indication of the insight and the suggested action, the user device operated by a user associated with the tenant.

A non-transitory computer-readable medium storing code for determining insights related to performance at a multi-tenant database system is described. The code may include instructions executable by a processor to store tenant-specific observability data for a plurality of tenants of the multi-tenant database system, detect an inefficiency corresponding to a performance metric for a tenant of the plurality of tenants based at least in part on a subset of the tenant-specific observability data associated with the tenant and corresponding to a threshold time window, analyze the subset of the tenant-specific observability data for the threshold time window to determine an insight indicating a cause of the inefficiency, determine a suggested action for the tenant based at least in part on the insight indicating the cause of the inefficiency, and send, for display at a user interface of a user device, an indication of the insight and the suggested action, the user device operated by a user associated with the tenant.

Some examples of the method, apparatuses, and non-transitory computer-readable medium described herein may further include operations, features, means, or instructions for receiving, via the user interface of the user device, a user input indicating a selection of the suggested action and performing the suggested action for the tenant in response to the user input.

Some examples of the method, apparatuses, and non-transitory computer-readable medium described herein may further include operations, features, means, or instructions for automatically performing the suggested action for the tenant based at least in part on determining the suggested action.

Some examples of the method, apparatuses, and non-transitory computer-readable medium described herein may further include operations, features, means, or instructions for receiving, via the user interface of the user device, a user input indicating the threshold time window for detection, wherein the subset of the tenant-specific observability data is based at least in part on the user input indicating the threshold time window.

Some examples of the method, apparatuses, and non-transitory computer-readable medium described herein may further include operations, features, means, or instructions for storing, with the tenant-specific observability data, a plurality of identifiers, wherein a data point of the tenant-specific observability data is associated with an identifier of the plurality of identifiers indicating a respective tenant of the plurality of tenants, and the tenant-specific observability data corresponds to a plurality of layers of the multi-tenant database system, and determining the subset of the tenant-specific observability data based at least in part on the plurality of identifiers, wherein each data point of the subset of the tenant-specific observability data is associated with a first identifier indicating the tenant of the plurality of tenants.

Some examples of the method, apparatuses, and non-transitory computer-readable medium described herein may further include operations, features, means, or instructions for receiving, via the user interface of the user device, a user input defining code for the tenant and tagging the code with an indication of the tenant, wherein analyzing the subset of the tenant-specific observability data for the threshold time window further comprises analyzing the code tagged with the indication of the tenant.

Some examples of the method, apparatuses, and non-transitory computer-readable medium described herein may further include operations, features, means, or instructions for disabling an integration, an application, an extension, or a combination thereof for the tenant based at least in part on the suggested action.

In some examples of the method, apparatuses, and non-transitory computer-readable medium described herein, the inefficiency is associated with a bulk data load procedure for the tenant. Some examples of the method, apparatuses, and non-transitory computer-readable medium described herein may further include operations, features, means, or instructions for modifying the bulk data load procedure from a first version to a second version based at least in part on the suggested action.

Some examples of the method, apparatuses, and non-transitory computer-readable medium described herein may further include operations, features, means, or instructions for modifying one or more operators in code associated with the tenant based at least in part on the suggested action.

In some examples of the method, apparatuses, and non-transitory computer-readable medium described herein, the inefficiency is associated with an update to code associated with the tenant. Some examples of the method, apparatuses, and non-transitory computer-readable medium described herein may further include operations, features, means, or instructions for rolling back the update to the code based at least in part on the suggested action.

In some examples of the method, apparatuses, and non-transitory computer-readable medium described herein, the inefficiency is associated with a database schema for the tenant at the multi-tenant database system. Some examples of the method, apparatuses, and non-transitory computer-readable medium described herein may further include operations, features, means, or instructions for updating the database schema for the tenant at the multi-tenant database system based at least in part on the suggested action.

In some examples of the method, apparatuses, and non-transitory computer-readable medium described herein, the inefficiency is associated with a batch size for a batch processing job. Some examples of the method, apparatuses, and non-transitory computer-readable medium described herein may further include operations, features, means, or instructions for updating the batch size for the batch processing job based at least in part on the suggested action.

In some examples of the method, apparatuses, and non-transitory computer-readable medium described herein, the tenant-specific observability data comprises a set of data logs for the tenant, a set of data transactions for the tenant, a set of user requests performed by users of the tenant, a set of distributed traces for the tenant, profiling data for the tenant, a first set of performance metrics associated with bulk data loading for the tenant, a second set of performance metrics associated with bulk data transfer for the tenant, or a combination thereof.

In some examples of the method, apparatuses, and non-transitory computer-readable medium described herein, the inefficiency corresponding to the performance metric comprises a processing time exceeding a threshold processing time, a quantity of processing resources exceeding a threshold quantity of processing resources, a quantity of memory resources exceeding a threshold quantity of memory resources, a quantity of errors exceeding a threshold quantity of errors, or a combination thereof.

In some examples of the method, apparatuses, and non-transitory computer-readable medium described herein, the insight indicating the cause of the inefficiency indicates that a query may be executed at a first frequency greater than a first threshold frequency, the query consumes a quantity of resources greater than a threshold quantity of resources, the query makes a quantity of calls to the multi-tenant database system exceeding a threshold quantity of calls, a page may be loaded at a second frequency greater than a second threshold frequency, first code related to a custom component for the tenant comprises one or more first inefficient portions, second code related to a process flow for the tenant comprises one or more second inefficient portions, one or more variable values used for a portion of code cause the inefficiency, one or more detected anomalies cause the inefficiency, or a combination thereof.

Some examples of the method, apparatuses, and non-transitory computer-readable medium described herein may further include operations, features, means, or instructions for aggregating a plurality of insights corresponding to at least two tenants of the plurality of tenants and updating the multi-tenant database system for the plurality of tenants based at least in part on the aggregated plurality of insights.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for determining insights related to performance at a multi-tenant database system, comprising:
    storing tenant-specific observability data for a plurality of tenants of the multi-tenant database system;
    detecting an inefficiency corresponding to a performance metric for a tenant of the plurality of tenants based at least in part on a subset of the tenant-specific observability data associated with the tenant and corresponding to a threshold time window;
    analyzing the subset of the tenant-specific observability data for the threshold time window to determine an insight indicating a cause of the inefficiency;
    determining a suggested action for the tenant based at least in part on the insight indicating the cause of the inefficiency;
    sending, for display at a user interface of a user device, an indication of the insight and the suggested action, the user device operated by a user associated with the tenant; and
    performing the suggested action, wherein performing the suggested action comprises at least one of:
        disabling an integration, an application, an extension, or a combination thereof for the tenant,
        modifying a bulk data load procedure for the tenant,
        modifying one or more operators in code associated with the tenant,
        rolling back an update to the code associated with the tenant,
        updating a database schema for the tenant at the multi-tenant database system, or
        updating a batch size for a batch processing job for the tenant.

2. The method of claim 1, further comprising:
    receiving, via the user interface of the user device, a user input indicating a selection of the suggested action, wherein the suggested action is performed for the tenant in response to the user input.

3. The method of claim 1, wherein performing the suggested action comprises:
    automatically performing the suggested action for the tenant based at least in part on determining the suggested action.

4. The method of claim 1, further comprising:
    receiving, via the user interface of the user device, a user input indicating the threshold time window for detection, wherein the subset of the tenant-specific observability data is based at least in part on the user input indicating the threshold time window.

5. The method of claim 1, further comprising:
storing, with the tenant-specific observability data, a plurality of identifiers, wherein a data point of the tenant-specific observability data is associated with an identifier of the plurality of identifiers indicating a respective tenant of the plurality of tenants, and the tenant-specific observability data corresponds to a plurality of layers of the multi-tenant database system; and
determining the subset of the tenant-specific observability data based at least in part on the plurality of identifiers, wherein each data point of the subset of the tenant-specific observability data is associated with a first identifier indicating the tenant of the plurality of tenants.

6. The method of claim 1, further comprising:
receiving, via the user interface of the user device, a user input defining the code for the tenant; and
tagging the code with an indication of the tenant, wherein analyzing the subset of the tenant-specific observability data for the threshold time window further comprises analyzing the code tagged with the indication of the tenant.

7. The method of claim 1, wherein the tenant-specific observability data comprises a set of data logs for the tenant, a set of data transactions for the tenant, a set of user requests performed by users of the tenant, a set of distributed traces for the tenant, profiling data for the tenant, a first set of performance metrics associated with bulk data loading for the tenant, a second set of performance metrics associated with bulk data transfer for the tenant, or a combination thereof.

8. The method of claim 1, wherein the inefficiency corresponding to the performance metric comprises a processing time exceeding a threshold processing time, a quantity of processing resources exceeding a threshold quantity of processing resources, a quantity of memory resources exceeding a threshold quantity of memory resources, a quantity of errors exceeding a threshold quantity of errors, or a combination thereof.

9. The method of claim 1, wherein the insight indicating the cause of the inefficiency indicates that a query is executed at a first frequency greater than a first threshold frequency, the query consumes a quantity of resources greater than a threshold quantity of resources, the query makes a quantity of calls to the multi-tenant database system exceeding a threshold quantity of calls, a page is loaded at a second frequency greater than a second threshold frequency, first code related to a custom component for the tenant comprises one or more first inefficient portions, second code related to a process flow for the tenant comprises one or more second inefficient portions, one or more variable values used for a portion of the code cause the inefficiency, one or more detected anomalies cause the inefficiency, or a combination thereof.

10. The method of claim 1, further comprising:
aggregating a plurality of insights corresponding to at least two tenants of the plurality of tenants; and
updating the multi-tenant database system for the plurality of tenants based at least in part on the aggregated plurality of insights.

11. An apparatus for determining insights related to performance at a multi-tenant database system, comprising:
a processor;
memory coupled with the processor; and
instructions stored in the memory and executable by the processor to cause the apparatus to:
store tenant-specific observability data for a plurality of tenants of the multi-tenant database system;
detect an inefficiency corresponding to a performance metric for a tenant of the plurality of tenants based at least in part on a subset of the tenant-specific observability data associated with the tenant and corresponding to a threshold time window;
analyze the subset of the tenant-specific observability data for the threshold time window to determine an insight indicating a cause of the inefficiency;
determine a suggested action for the tenant based at least in part on the insight indicating the cause of the inefficiency;
send, for display at a user interface of a user device, an indication of the insight and the suggested action, the user device operated by a user associated with the tenant; and
perform the suggested action, wherein, to perform the suggested action, the instructions are executable by the processor to cause the apparatus to:
disable an integration, an application, an extension, or a combination thereof for the tenant,
modify a bulk data load procedure for the tenant,
modify one or more operators in code associated with the tenant,
roll back an update to the code associated with the tenant,
update a database schema for the tenant at the multi-tenant database system, or
update a batch size for a batch processing job for the tenant.

12. The apparatus of claim 11, wherein the instructions are further executable by the processor to cause the apparatus to:
receive, via the user interface of the user device, a user input indicating a selection of the suggested action, wherein, to perform the suggested action, the instructions are executable by the processor to cause the apparatus to:
perform the suggested action for the tenant in response to the user input.

13. The apparatus of claim 11, wherein, to perform the suggested action, the instructions are executable by the processor to cause the apparatus to:
automatically perform the suggested action for the tenant based at least in part on determining the suggested action.

14. The apparatus of claim 11, wherein the instructions are further executable by the processor to cause the apparatus to:
receive, via the user interface of the user device, a user input indicating the threshold time window for detection, wherein the subset of the tenant-specific observability data is based at least in part on the user input indicating the threshold time window.

15. The apparatus of claim 11, wherein the instructions are further executable by the processor to cause the apparatus to:
store, with the tenant-specific observability data, a plurality of identifiers, wherein a data point of the tenant-specific observability data is associated with an identifier of the plurality of identifiers indicating a respective tenant of the plurality of tenants, and the tenant-specific observability data corresponds to a plurality of layers of the multi-tenant database system; and
determine the subset of the tenant-specific observability data based at least in part on the plurality of identifiers, wherein each data point of the subset of the tenant-specific observability data is associated with a first identifier indicating the tenant of the plurality of tenants.

16. A non-transitory computer-readable medium storing first code for determining insights related to performance at a multi-tenant database system, the first code comprising instructions executable by a processor to:
    store tenant-specific observability data for a plurality of tenants of the multi-tenant database system;
    detect an inefficiency corresponding to a performance metric for a tenant of the plurality of tenants based at least in part on a subset of the tenant-specific observability data associated with the tenant and corresponding to a threshold time window;
    analyze the subset of the tenant-specific observability data for the threshold time window to determine an insight indicating a cause of the inefficiency;
    determine a suggested action for the tenant based at least in part on the insight indicating the cause of the inefficiency;
    send, for display at a user interface of a user device, an indication of the insight and the suggested action, the user device operated by a user associated with the tenant; and
    perform the suggested action, wherein, to perform the suggested action, the instructions are executable by the processor to:
        disable an integration, an application, an extension, or a combination thereof for the tenant,
        modify a bulk data load procedure for the tenant,
        modify one or more operators in second code associated with the tenant,
        roll back an update to the second code associated with the tenant,
        update a database schema for the tenant at the multi-tenant database system, or
        update a batch size for a batch processing job for the tenant.

17. The non-transitory computer-readable medium of claim 16, wherein the instructions are further executable by the processor to:
    receive, via the user interface of the user device, a user input indicating a selection of the suggested action, wherein, to perform the suggested action, the instructions are executable by the processor to:
        perform the suggested action for the tenant in response to the user input.

18. The non-transitory computer-readable medium of claim 16, wherein, to perform the suggested action, the instructions are executable by the processor to:
    automatically perform the suggested action for the tenant based at least in part on determining the suggested action.

19. The non-transitory computer-readable medium of claim 16, wherein the instructions are further executable by the processor to:
    receive, via the user interface of the user device, a user input indicating the threshold time window for detection, wherein the subset of the tenant-specific observability data is based at least in part on the user input indicating the threshold time window.

20. The non-transitory computer-readable medium of claim 16, wherein the instructions are further executable by the processor to:
    store, with the tenant-specific observability data, a plurality of identifiers, wherein a data point of the tenant-specific observability data is associated with an identifier of the plurality of identifiers indicating a respective tenant of the plurality of tenants, and the tenant-specific observability data corresponds to a plurality of layers of the multi-tenant database system; and
    determine the subset of the tenant-specific observability data based at least in part on the plurality of identifiers, wherein each data point of the subset of the tenant-specific observability data is associated with a first identifier indicating the tenant of the plurality of tenants.

* * * * *

UNITED STATES PATENT AND TRADEMARK OFFICE
CERTIFICATE OF CORRECTION

PATENT NO. : 12,038,816 B2  
APPLICATION NO. : 17/934932  
DATED : July 16, 2024  
INVENTOR(S) : Teyer et al.

Page 1 of 1

It is certified that error appears in the above-identified patent and that said Letters Patent is hereby corrected as shown below:

On the Title Page

Item (54) and In the Specification, Column 1, Lines 1-4, delete "DETERMINING INSIGHTS RELATED TO PERFORMANCE BOTTLENECKS IN A MULTI-TENANT DATABASE SYSTEM PRELIMINARY CLASS" and add ---DETERMINING INSIGHTS RELATED TO PERFORMANCE BOTTLENECKS IN A MULTI-TENANT DATABASE SYSTEM---

Signed and Sealed this  
First Day of October, 2024

Katherine Kelly Vidal  
*Director of the United States Patent and Trademark Office*